(12) United States Patent
Kucharczyk

(10) Patent No.: US 8,687,491 B2
(45) Date of Patent: Apr. 1, 2014

(54) SYSTEMS, APPARATUS, AND METHODS FOR MANAGING AN OVERFLOW OF DATA PACKETS RECEIVED BY A SWITCH

(75) Inventor: David Kucharczyk, Santa Fe, NM (US)

(73) Assignee: VSS Monitoring, Inc., Sunnyvale, CA (US)

( * ) Notice: Subject to any disclaimer, the term of this patent is extended or adjusted under 35 U.S.C. 154(b) by 284 days.

(21) Appl. No.: 13/080,589

(22) Filed: Apr. 5, 2011

(65) Prior Publication Data

US 2012/0257501 A1    Oct. 11, 2012

(51) Int. Cl.
*H04L 12/56* (2011.01)
(52) U.S. Cl.
USPC ........... 370/235; 370/351; 370/389; 370/412; 370/428; 370/429
(58) Field of Classification Search
None
See application file for complete search history.

(56) References Cited

U.S. PATENT DOCUMENTS

| | | | | |
|---|---|---|---|---|
| 7,372,814 B1 * | 5/2008 | Chiruvolu et al. | ............ | 370/235 |
| 7,688,736 B1 * | 3/2010 | Walsh | ............ | 370/236 |
| 8,411,574 B2 * | 4/2013 | Liu et al. | ............ | 370/236 |
| 2004/0179476 A1 * | 9/2004 | Kim et al. | ............ | 370/230 |
| 2006/0092837 A1 * | 5/2006 | Kwan et al. | ............ | 370/229 |
| 2011/0164496 A1 * | 7/2011 | Loh et al. | ............ | 370/230 |
| 2012/0063313 A1 * | 3/2012 | Zhou et al. | ............ | 370/235 |

* cited by examiner

*Primary Examiner* — Charles C Jiang
*Assistant Examiner* — Amy Ling
(74) *Attorney, Agent, or Firm* — Edwards Wildman Palmer LLP; Scott D. Wofsy; Christopher J. Capelli

(57) ABSTRACT

Systems, apparatus, and methods for managing an overflow of data packets received by a switch are disclosed. A traffic flow of data packets may be transmitted to a switch and it may be determined whether the switch has sufficient input capacity available to enable receipt of the transmitted data packets. When the input capacity of the switch is insufficient, a traffic flow control measure may be implemented to, for example, pause, limit, filter, or otherwise modify the traffic flow of data packets so that any overflowing data packets will not be lost or otherwise compromised due to the switch's inability to accept the data packets.

22 Claims, 18 Drawing Sheets

101

Communication Device
110

↕ 140

In-line Network Device
130-130c

↕ 140

Communication Device
110

Controller
145

↕ 140

Buffering System
170-170d

User/Administrator
155

FIG. 1B

SYSTEMS, APPARATUS, AND METHODS FOR MANAGING AN OVERFLOW OF DATA PACKETS RECEIVED BY A SWITCH

FIELD OF INVENTION

The present invention relates to transmission of data packets in a communication network, in general, and to the management of an overflow of data packets received by a switch included in the communication network, in particular.

BACKGROUND

Large-scale integration of components in data packet switching technology, such as Ethernet switching technology, has led to complete data packet switches being constructed or produced on a single chip or within a single unit. These single-unit data packet switches typically include a switching matrix, input/output port buffers, common shared memory pools, switching/routing tables and all other functions required to perform data packet switching and are commonly used for routing packets in a network or system backplane based on various criteria as appropriate to particular circumstances.

This large-scale integration in data packet switching technology has led to decreased cost for the production of data packet switches and has decreased the number of external components required to achieve the same switching capability over previously available data packet switches. However, this integration has the disadvantage of decreased flexibility in a system using a single-unit data packet switch, as a whole. This decrease in flexibility is primarily due to various design tradeoffs that are made in order to increase the efficiency of single-unit data packet switch construction. For example, such single-unit data packet switches are often optimized for typical network or backplane deployments with the expectation of randomized data flows across all input and output ports of the switch. In certain circumstances, such as network monitoring, port aggregation, and/or link load balancing, egress ports of a single-unit data packet switch may be easily oversubscribed on a temporary basis, for example, when highly intensive data streams, such as data streams including video information, are transmitted. This over-subscription typically leads to packet loss, as the buffer space of the typical single-unit data packet switch chip is fully utilized within a few hundred or a few thousand data packets. The capability of the buffer available inside a typical single-unit data packet switch is thus inadequate as the line rate, or the traffic flow rate of data packets across or entering the switch, increases. For example, at a line rate of ten gigabits per second or more, such small buffer sizes are of little value, especially when bursts of hundreds of thousands of packets may need to be momentarily deferred or equalized across slower speed exit ports of the integrated data packet switch.

Providing appropriately large buffer sizing in commodity or commercially available single-unit data packet switches would drive the cost of these devices significantly higher and have limited benefit to all but a few specific uses and therefore, would benefit a relatively small percentage of users. Thus, there is little economic incentive to produce single-unit data packet switches with internal memories large enough to buffer large bursts of thousands of data packets for the relatively small proportion of data packet switch applications that require such large internal buffering capability.

SUMMARY

Systems, apparatus, and methods for managing an overflow of data packets received by a switch are herein described.

In one embodiment, a traffic flow of data packets may be received by a processing device, such as an application specific integrated circuit (ASIC), a central processing unit (CPU), and/or a field programmable gate array (FPGA) resident in, for example, an in-line network device. The traffic flow of data packets may be received via an ingress port and/or a bi-directional port resident in the in-line network device from one or more transmitting entities such as a communication device, a router, a computer, or a mobile telephone.

Once received, the processing device may transmit the traffic flow of data packets to a switch that, in some embodiments, is resident in the in-line network device. The switch may determine whether it has sufficient input capacity available to enable receipt of some or all of the transmitted data packets. In cases where input capacity is not sufficient to accept some or all of the data packets transmitted by the processing device, the switch may reject some or all of the transmitted data packets. The switch may reject the transmitted data packets by, for example, sending a pause message to the processing device indicating that the processing device should cease, slow down, or otherwise modify its transmission of data packets. The processing device may then transmit the rejected data packets to a memory. The rejected data packets may then be stored in a memory. The memory may be physically resident inside and/or outside the in-line network device. Following the passage of an interval of time, the switch may determine whether it has sufficient input capacity available to enable the receipt of transmitted data packets and may transmit a message to the processing device indicating that it has available input capacity.

Upon receiving a message that the switch has sufficient input capacity to receive data packets, the stored data packets may be retrieved from the memory by, for example, the processing device and/or a direct memory access (DMA) device. Next, the processing device may transmit the retrieved data packets to the switch and the switch may accept the transmitted data packets.

In some cases, the switch may include an input buffer. The input buffer may be adapted to buffer data packets transmitted to the switch and the determination of whether sufficient input capacity is available at the switch may include determining whether the number of data packets stored in the input buffer exceeds a threshold amount or the rate at which the data packets are received exceeds a threshold. In one embodiment, the determination of whether the switch has sufficient input capacity available includes receiving by the processing device a message from the switch indicating whether input capacity available at the switch and/or buffer is sufficient to enable receipt of some or all of the transmitted data packets.

In one embodiment, a traffic flow of data packets may be received by an in-line network device via a bi-directional port wherein the in-line network device includes a plurality of bi-directional ports. The traffic flow data packets may then be transmitted to a switch by the in-line network device. It may then be determined whether the switch has sufficient input capacity available to enable receipt of the transmitted data packets. This determination may be made by the switch and/or a controller and may include a determination of whether the rate of the traffic flow of transmitted data packets exceeds a threshold traffic flow rate and/or whether the output capacity of the switch is sufficient to transmit the traffic flow of data packets to one or more external devices. In cases where the switch includes an input buffer that is adapted to buffer data packets incoming to the switch, the determination of whether sufficient input capacity is available at the switch may include determining whether the number of data packets stored in the input buffer exceeds a threshold number or the rate at which the data packets are received exceeds a threshold.

When a determination is made that the input capacity available at the switch is insufficient, one or more traffic flow control measures may be implemented by, for example, the switch and/or the controller.

In one embodiment, the incoming traffic flow rate of the one or more bi-directional ports may be monitored and the traffic flow control measure may be implemented when the monitored traffic flow rate exceeds a threshold traffic flow rate for the switch and/or input buffer. The implemented traffic flow control measure may include, for example, pausing, limiting, and/or filtering the traffic flow of data packets incoming to at least one bi-directional port of the switch or input buffer.

In another embodiment, a characteristic of one or more data packets included in the traffic flow of data packets may be determined and a flow control measure may be implemented on the traffic flowing into the switch based on the determined characteristic. In this embodiment, the implemented traffic flow control measure may include filtering, sorting, discarding, and/or prioritizing, one or more data packets included in the traffic flow of data packets based on the determined characteristic.

In a further embodiment, the traffic flow of data packets may be buffered in a buffer by the switch and/or the controller and a characteristic of the buffered data packets may be determined. An action, such as a traffic control measure, may then be performed on the buffered data packets by the switch, the buffer, and/or the controller. In some cases, the action performed on the buffered data packets may be in response to the determined characteristic. Exemplary actions performed on the buffered data packets include discarding a buffered data packet, prioritizing an order in which the buffered data packets are transmitted from the input buffer, filtering the traffic flow of data packets based on the determined characteristic, and/or discarding one or more data packets included in the traffic flow of data packets based on the determined characteristic.

In cases where the determined characteristic is a duration of time that the buffered data packets are stored in the input buffer, the action performed on the buffered data packets may include prioritizing an order in which the buffered data packets are transmitted from the buffer, determining an egress port or a bi-directional port for a buffered data packet by which the buffered data packet will be transmitted from the switch to an external device, truncating a buffered data packet, editing a buffered data packet and/or discarding a buffered data packet based on the duration of time that the buffered data packet was stored in the input buffer.

In one embodiment, the traffic flow control measure may include the transmission of a pause message to the processing device wherein the pause message may instruct the processing device to pause its transmission of data packets to the switch. In some cases, the pause message may be compatible with the Institute of Electrical and Electronics Engineers (IEEE) 802.3 standards for Media Access Control (MAC) Ethernet Flow Control and/or pause frames. In response to the pause message, the processing device may store the paused data packets in a memory.

Exemplary apparatus or in-line devices provided herein include at least one bi-directional port for receiving a traffic flow of data packets and transmitting at least a portion of the traffic flow of data packets to one or more processing devices and/or external devices. The apparatus may also include a processing device for transmitting at least a portion of the data packets received via the bi-directional port to a switch and/or a memory. In some cases the switch may be an Ethernet switch, a packet switch, or a fabric switch. The switch may receive the transmitted portion of the traffic flow of data packets from the processing device and direct the received portion of the traffic flow of data packets to, for example, the bi-directional port for eventual transmission to, for example, an external device.

The apparatus may also include a controller, for determining whether, for example, the input capacity available at the switch is sufficient to enable receipt of a transmitted portion of the traffic flow of data packets and implementing a traffic flow control measure based on a determination that, for example, input capacity at the switch is insufficient to enable receipt of some or all of the transmitted portion of the traffic flow of data packets. The apparatus may further include a memory for receiving a portion of the traffic flow of data packets transmitted by the processing device and storing a received portion of the traffic flow of data packets not transmitted to the switch due to the implementation of the traffic control measure. In some embodiments, the apparatus may include an input buffer for buffering data packets included in the traffic flow of data packets.

Systems for implementing one or more methods described herein may include an in-line network device for receiving a traffic flow of data packets and transmitting the received data packets through a buffering system. The in-line network device may be, for example, a network captured traffic distribution device, a network tap, a backplane device, a router, an aggregator, and/or a matrix switch.

The buffering system may include at least one bi-directional port for receiving a traffic flow of data packets from the in-line network device and transmitting the received data packets to a switch. The switch may be enabled to receive the traffic flow of data packets and direct the received data packets to an external device. The switch may also include a processing device enabled to transmit received data packets to at least one of the switch and a memory enabled to store data packets received from the processing device. In some cases, the allocation of the memory may be dynamic and may be controlled by a user, administrator, or the controller.

In some embodiments, the system may include a controller for determining whether the input capacity available at the switch is sufficient to enable receipt of some or all of the transmitted data packets and implementing a traffic flow control measure based upon the determination that input capacity at the switch is insufficient.

These and further embodiments of the invention are discussed in greater detail below.

BRIEF DESCRIPTION OF THE DRAWINGS

The present application is illustrated by way of example, and not limitation, in the figures of the accompanying drawings in which:

FIGS. 1A-1C are a block diagrams illustrating exemplary network communication systems, in accordance with embodiments of the present invention;

DESCRIPTION

Systems, apparatus, and methods for managing an overflow of data packets received by a switch are herein described. A traffic flow of data packets may be transmitted to a switch and it may be determined whether the switch has sufficient input capacity available to enable receipt of the transmitted data packets. When the input capacity of the switch is insufficient, such as when an overflow of data packets is received at a switch, a traffic flow control measure may be implemented to, for example, pause, limit, filter, or otherwise modify the traffic flow of data packets so that any overflowing data packets will not be lost or otherwise compromised due to the switch's inability to accept the data packets.

Figure 1A:
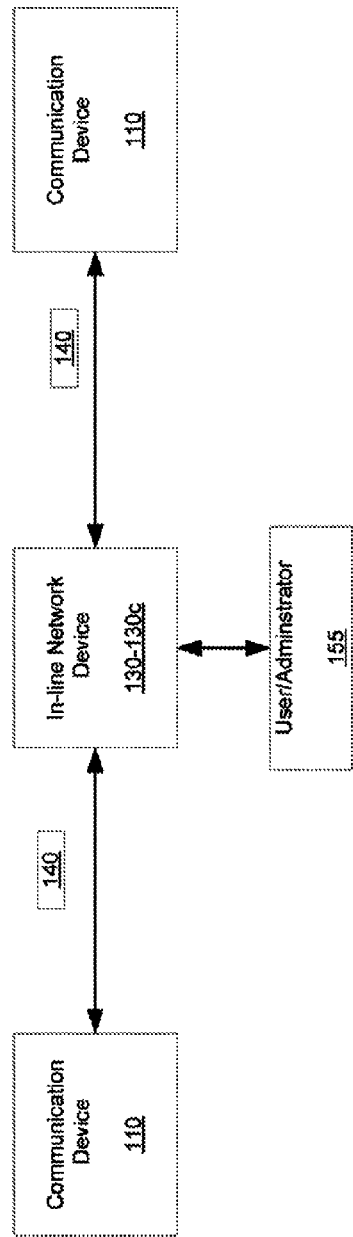

FIG. 1A is block diagram depicting an exemplary network communication system 100. System 100 may be any system capable of transmitting and/or receiving a traffic flow of data packets 140, such as a local area network (LAN) and/or a wireless local area network (WLAN). In some embodiments, system 100 may be a telecommunication system, such as a Global System for Mobile communication (GSM) system or a multi-protocol label switching (MPLS) system. In other embodiments, system 100 may be Gateway General Packet Radio Service (GPRS) system, an Enhanced Data Rates for GSM Evolution (EDGE) system, an Enhanced GPRS (EG-PRS) system, an International Mobile Telecommunications-2000 (IMT-2000) system, an IMT Single Carrier (IMT-SC) system, an Universal Mobile Telecommunications System (UMTS) system, a Long Term Evolution (LTE) system, a Code Division Multiple Access (CDMA) system, a system compliant with the IEEE 802.1 Q standard for configuring virtual LANs (VLAN), or a system enabled to transmit and/or receive data packets including VLAN tags.

System 100 may include a communication device 110 communicatively coupled, for example, serially or in-parallel, to an in-line network device 130-130c. Communication device 110 may be any device capable of generating, receiving, transmitting, and/or forwarding data packet 140. Exemplary communication devices 100 include personal computers, mobile computing devices, and mobile telephones. Data packets 140 may flow between communication devices 110 and in-line network device 130-130c.

In-line network device 130-130c may be any in-line network device capable of operating, for example, in-line, serially or in-parallel, with a communication link coupling at least two or more communication devices 110. Exemplary in-line network devices 130-130c include a captured traffic distribution device, a network tap, a backplane device, a router, an aggregator, or a matrix switch. In-line network device 130-130c may include a plurality of uni-directional and/or bi-directional ports that enable it to communicate with the other components of system 100. In some cases, a uni-directional and/or bi-directional port may be a monitor port or a stacking port.

In-line network device 130-130c may also be communicatively coupled so as to provide information to and/or receive instructions from a user and/or administrator 155. User/administrator 155 may be, for example, a user and/or administrator of, for example, system 100 and/or in-line network device 130-130c. User/administrator 155 may communicate, for example, configuration information and/or instructions to in-line network device 130-130c.

FIG. 1B is block diagram depicting an exemplary network communication system 101 similar to network communication system 100. Network communication system 101 includes two communication devices 110 communicatively coupled, for example, serially or in-parallel, to in-line network device 130-130c. Network communication system 101 may also include a user/administrator 155 communicatively coupled to in-line network device 130-130c, a controller 145, and/or a buffering system 170-170d. Network communication system 101 may further include data packets 140 flowing between, for example, communication devices 110, in-line network device 130-130c, controller 145, and/or buffering system 170-170d.

Controller 145 may be communicatively coupled to in-line network device 130-130c and buffering system 170-170d via a data path (shown in FIG. 1B as a solid line) thus enabling and/or controlling a flow of data and/or data packets between controller 145 and in-line network device 130-130c and/or between controller 145 and buffering system 170-170d. In one embodiment, controller 145 may operate to monitor the status of in-line network device 130-130c, a switch, and/or buffering system 170-170d and in cases wherein the switch includes an internal buffer, controller 145 may also monitor the status of the internal buffer. The monitoring of controller 145 may utilize data and/or data packets received via the data path.

Controller 145 may also be communicatively coupled to in-line network device 130-130c and buffering system 170-170d via a control signaling path (shown in FIG. 1B as a dashed line) thus enabling the flow of control signals between controller 145 and in-line network device 130-130c and/or between controller 145 and buffering system 170-170d. Controller 145 may be enabled to control the traffic flow of data packets to and from in-line network device 130-130c, a switch resident in, for example, in-line network device 130-130c and/or buffering system 170-170d via a control signal transmitted along the control signaling path. In another embodiment, controller 145 may also be enabled to generate and transmit a control signal to a processing device, such as an ASIC, a FPGA, and/or a CPU resident in, for example, in-line network device 130-130c and/or buffering system 170-170d, indicating that a traffic flow control measure is to be implemented.

Although controller 145 is shown as a separate, standalone component in system 101, some or all of the hardware necessary to execute the functions of controller 145 may be resident in in-line network device 130-130c, buffering system 170-170d, and/or a combination of one or more of controller 145, in-line network device 130-130c, and buffering system 170-170d. In one embodiment, controller 145 may be designed to receive instructions, from, for example, user/administrator 155 via, for example, management port 230.

Buffering system 170-170*d* may operate to buffer a traffic flow of data packets transmitted via systems 100-102 and may control or limit a traffic flow rate of data packets transmitted via systems 100-102.

In one embodiment, buffering system 170-170*d* may be enabled to calculate and/or receive instructions regarding an allowed incoming or outgoing traffic flow rate for in-line network device 130-130*c*, buffering system 170-170*d*, and/or switch 205-205*c* included in either in-line network device 130-130*c* or buffering system 170-170*d*. The instructions may be received from, for example, user/administrator 155 via, for example, management port 230. An allowed incoming or outgoing traffic flow rate may be calculated by buffering system 170-170*d* based on the bandwidth available to egress port(s) included in in-line network device 130-130*c*, buffering system 170-170*d*, and/or a switch. For example, when buffering system 170-170*d*, in-line network device 130-130*c*, and/or a switch is equipped with a 10 gigabyte ingress port and only three one gigabyte output ports, buffering system 170-170*d* may be programmed to limit the traffic incoming to in-line network device 130-130*c*, buffering system 170-170*d*, and/or the switch to a bandwidth less than three gigabytes in order to accommodate the available egress bandwidth. Further details regarding the internal components included in buffering system 170-170*d* and the operation of buffering system are provided below with reference to FIGS. 3A-3E.

Network communication system 101 may also include user/administrator 155 communicatively coupled to in-line network device 130-130*c*, controller 145, and/or buffering system 170-170*d*. Network communication system 101 may further include data packets 140 flowing between communication devices 110, in-line network device 130-130*c*, controller 145, and/or buffering system 170-170*d*. User/administrator 155 may be communicatively coupled to in-line network device 130-130*c*, controller 145, and/or buffering system 170-170*d*.

Figure 1C:
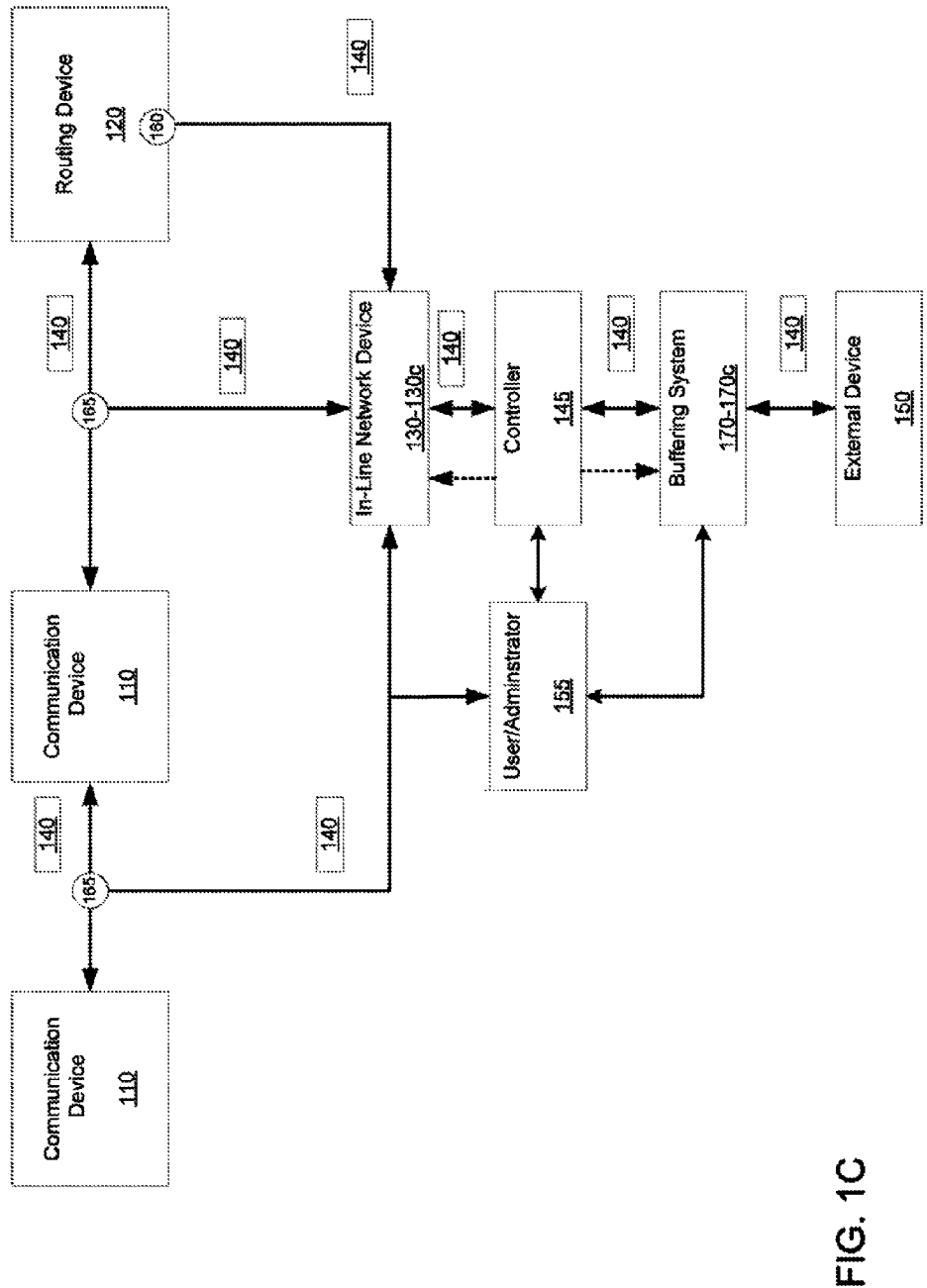

FIG. 1C is block diagram depicting an exemplary network communication system 102 similar to network communication systems 100 and 101, wherein in-line network device 130-130*c* is a network captured traffic distribution tool or a network tap. In some cases, a port included in in-line network device 130-130*c* may be a monitor port or a stacking port.

Network communication system 102 includes a plurality of communication devices 110 communicatively coupled, for example, serially and/or in-parallel, to in-line network device 130-130*c*, Communication device 110 may generate a data packet 140 and transmit data packet 140 to a routing device communicatively coupled to communication device 110 and/or in-line network device 130-130*c*, such as routing device 120 via a communication link. Routing device 120 may be any router enabled to route data packets through communication system 102. Routing device 120 may include a mirror port 160 via which captured data packets, including data packet 140, may be transmitted to in-line network device 130-130*c*.

In-line network device 130-130*c* may also be communicatively coupled to a traffic capture point 165 located along a communication link between two communication devices 110 and/or between communication device 110 and routing device 120 and thereby may capture data packets, like data packets 140, via an in-line traffic capture point 165. Controller 145 may be communicatively coupled to in-line network device 130-103*c* and/or user/administrator 155 via a data path (shown in FIG. 1C as a solid line) and/or a control signaling path (shown in FIG. 1C as a dashed line). User/administrator 155 may be further communicatively coupled to controller 145 and/or buffering system 170-170*d*.

System 102 may also include an external device 150 for receiving captured data packets via in-line network device 130-130*c*. Exemplary external devices 150 include network monitors and network analyzing devices. External device 150 may be communicatively coupled to buffering system 170-170*d*.

Figure 2A:
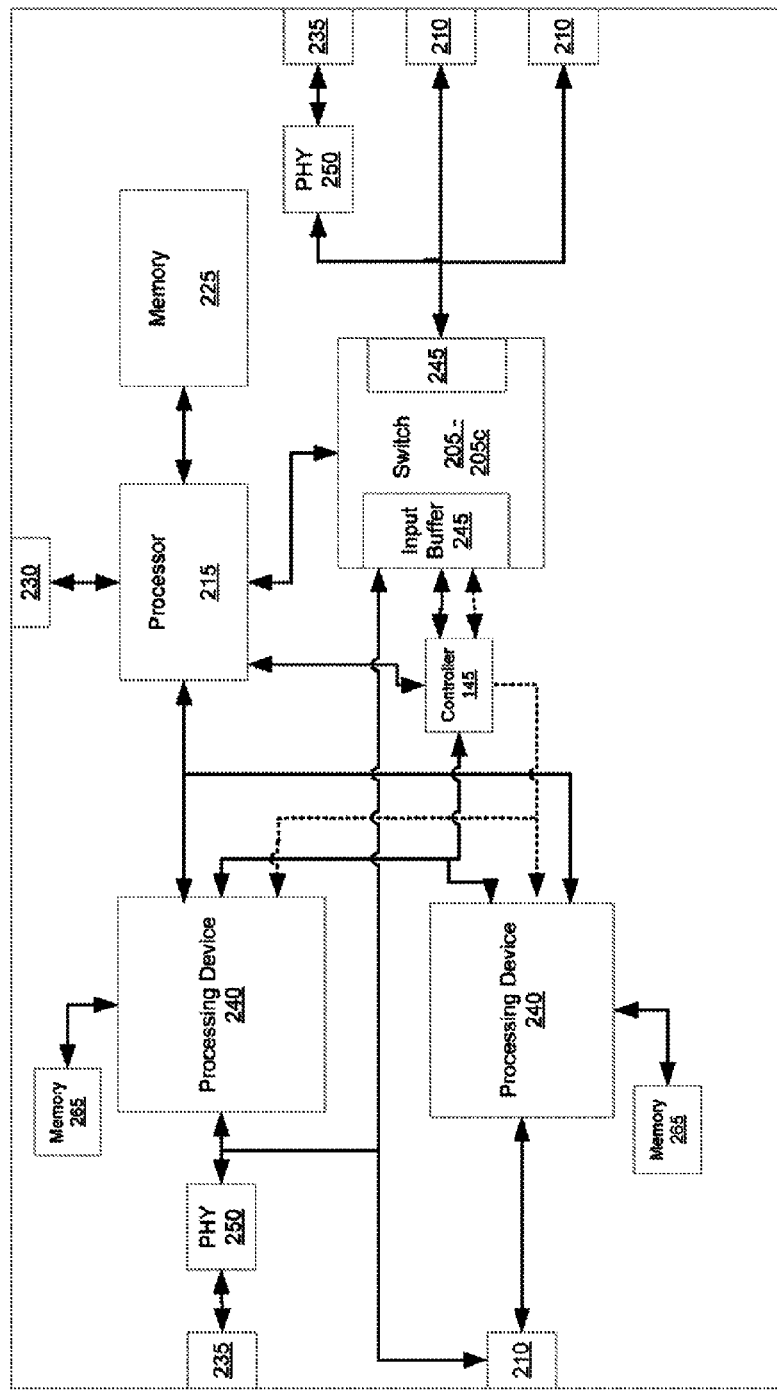
FIGS. 2A-2C are block diagrams illustrating exemplary in-line network devices, in accordance with embodiments of the present invention.

FIG. 2A is a block diagram illustrating an exemplary in-line network device 130*a*. In-line network device 130*a* may include a bi-directional port 235 equipped to interface with copper media and a bi-directional port 210 capable of interfacing with optical fiber media. Bi-directional port 235 may be coupled to a PHY 250. One or more bi-directional ports 210 or 235 may be configured as a monitoring and/or stacking port.

In-line network device 130*a* may also include, one or more processing devices 240 coupled to one or more memories 265. Processing devices 240 may also be coupled to, a controller 145 via a data path (shown in FIG. 2A as a solid line) and/or a control signaling path (shown in FIG. 2A as a dashed line). Processing devices 240 may be further coupled to a processor 215. Processor 215 may be further coupled to a management port 230, a memory 225, and a switch 205-205*c*. In some embodiments, switch 205-205*c* may include one or more input buffers 245. Switch 205-205*c* may be coupled to PHY 250 and/or bi-directional port 210. Further details regarding exemplary switches 205*a-c* and components included therein are provided below with regard to FIGS. 2D-2F.

Data packets, such as data packet 140, may be received by in-line network device 130*a* via one or more bi-directional ports 235 and/or 210. Data packets may be received from, for example, a communication device like communication device 110, a mirror port, like mirror port 160, and/or an in-line traffic capture point, like in-line traffic capture point 165. PHY 250 may be any component enabled to facilitate communication between copper media bi-directional port 235 and a component of in-line network device 130*a*, like processing device 240. Received data packets may be forwarded to one or more processing devices 240. Exemplary processing devices 240 include FPGAs, ASICs or CPUs. Processing device 240 may be placed in-line, for example, serially or in-parallel, with the data path of switch 205-205*c* and may be any dedicated logic device enabled to receive data packets via bi-directional port 235 and/or 210.

Switch 205-205*c*, is communicatively coupled to one or more processing devices 240 and one or more bi-directional ports 210 and/or bi-directional port 235/PHY 250 pairs. Switch 205-205*c* may direct, or forward, a received data packet to a bi-directional port, like bi-directional ports 210 and/or bi-directional port 235/PHY 250 pair via which received data packets may be transmitted to one or more external devices, such as external device 150. On some occasions, switch 205-205*c* may forward a received data packet to one or more bi-directional ports 210 and/or bi-directional port 235/PHY 250 pair according to one or more criteria. Exemplary criteria may include the source of a data packet, the content of a data packet, the size of a data packet, the volume of data packets flowing through switch 205-205*c*, a load aggregation consideration, or a load balancing consideration.

Switch 205-205*c* may include an input buffer 245. Input buffer 245 may buffer incoming data packets when, for example, the available input capacity of switch 205-205*c* is insufficient to receive some, or all, of data packets incoming to switch 205-205*c* or when switch 205-205*c* is receiving data packets from two or more processing devices during a same interval of time. When input buffer 245 reaches a threshold amount of capacity for buffering data packets, input buffer 245 may implement a traffic flow control measure and communicate the initiation of the traffic flow control measure to one or more processing devices 240. Further details regarding traffic flow control measures are provided below with regard to FIGS. 4-7. In some embodiments, the communicated traffic flow control measure may instruct processing device 240 to pause or decrease the rate of traffic flowing to the switch. In these embodiments, processing device may store one or more data packets not transmitted to switch 205-205c in a memory, such as memory 265. Processing device 240 may continue to store data packets in memory 265 until, for example, it receives an indication to disable the traffic flow control measure or the instructions regarding the traffic flow control measure expire.

Processor 215, which is communicatively coupled to switch 205-205c, may be any appropriate processing device or combination of processing devices and may execute one or more instructions resident in, for example, a memory 225 that is communicatively coupled to processor 215. Memory 225 may be any appropriate data storage device or combination of data storage devices and may store one or more instructions executable by processor 215, processing device 240, and/or switch 205-205c. Processor 215 may be managed via, for example, a management port like management port 230 by, for example, a user or administrator such as user/administrator 155.

Memory 265 may be any memory capable of storing one or more data packets. Although memory 265 is shown as a single device within in-line network device 130a, it may be any number of data storage devices physically located inside and/or outside in-line network device 130a. Exemplary memory 265 includes static random access memory (SRAM) and dynamic random access memory (DRAM). Memory 265 may be of a sufficient size to enable the storage of thousands, hundreds of thousands, or any number of data packets. In some cases, processing device 240 and memory 265 may act together as a buffering system for one or more bi-directional ports of in-line network device 130a and may serve to buffer ingoing and/or outgoing traffic. On some occasions, for example, during non-congested operating conditions, processing device 240 and/or memory 265 may not be enabled, thus allowing ingressing data packets to be passed directly from bi-directional port 210 and/or bi-directional port 235 and PHY 250 to switch 205-205c. Disabling of processing device 240 and/or memory 265 may be executed by, for example, controller 145 via the control signaling path and/or processor 215.

The utilization of available memory 265 can be dynamically changed by, for example, controller 145, thus allowing controller 145 to change the allocation of memory in cases of in-line devices with multiple bi-directional ports sharing a single memory.

The operation of in-line network device 130-130c is not limited to ingressing ports only, as reversing the data path allows for the buffering of egressing traffic, for example, upon receipt of a signal from an external communication device such as communication device 110, indicating that the device is oversubscribed and/or is otherwise unable to accept further incoming data packets.

Figure 2B:
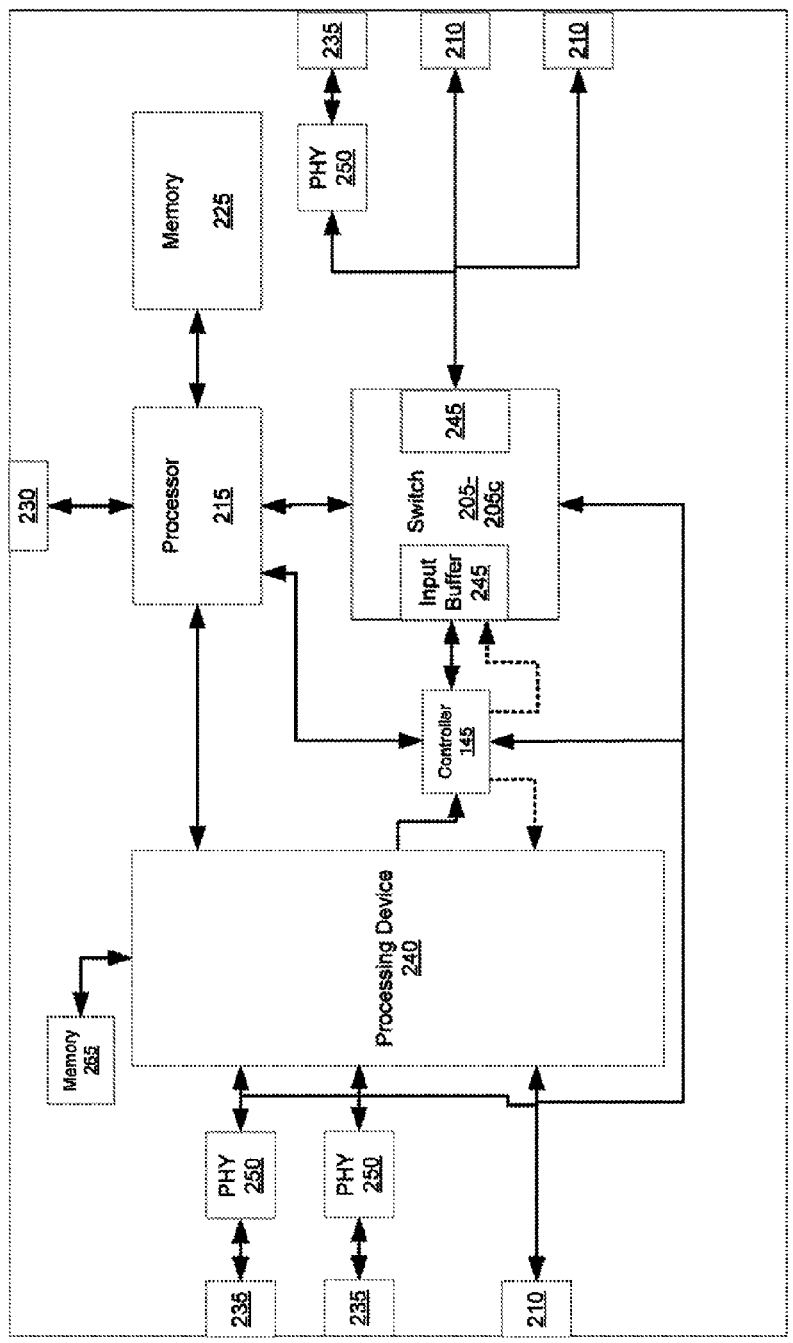

FIG. 2B is a block diagram illustrating an exemplary in-line network device 130b including multiple bi-directional ports 235 and 210 that share processing device 240 and/or memory 265. The components of in-line network device 130b may include any number of bi-directional ports 235 and 210. Bi-directional ports 235 may be coupled to PHY 250 thus forming a bi-directional port 235/PHY 250 pair. One or more bi-directional ports 210 or 235 may be configured as a monitoring and/or stacking port.

In-line network device 130b may also include, one or more processing devices 240 coupled to bi-directional port 235/PHY 250 pair, bi-directional port 210, and/or one or more memories 265. Processing devices 240 may also be coupled to a controller 145 via a data path (shown in FIG. 2B as a solid line) and/or a control signaling path (shown in FIG. 2B as a dashed line). Processing devices 240 may be further coupled to a processor 215. Processor 215 may also be coupled to management port 230, memory 225, controller 145, and/or switch 205-205c. In some embodiments, switch 205-205c may include one or more input buffers 245. Switch 205-205c may be coupled to PHY 250 and/or bi-directional port 210. Further details regarding exemplary switches 205a-c and components included therein are provided below with regard to FIGS. 2D-2F.

Sharing processing device 240 and memory 265 between multiple bi-directional ports 210 and bi-directional port 235/PHY 250 pairs, as illustrated in FIG. 2B, provides an advantage of decreasing the number of overall components required for in-line network device 130b when compared with in-line network device 130a. Thus, in-line network device 130b has a design that may decrease the complexity of programming and managing in-line network device 130b, relative to in-line network device 130a. Possible advantages of the configuration of in-line network device 130a when compared with in-line network device 130b include the ability to use processing devices 240 and/or memories 265 of a smaller size and/or lower cost than those used for in-line network device 130b.

On some occasions, for example, during non-congested operating conditions, one or more processing devices 240 and/or memories 265 may not be enabled, thus allowing ingressing data packets to be passed directly from bi-directional port 210 and/or bi-directional port 235 and PHY 250 to controller 145 and/or switch 205-205c. Disabling of processing device 240 and/or memory 265 may be executed by, for example, controller 145 via the control signaling path and/or processor 215.

Figure 2C:
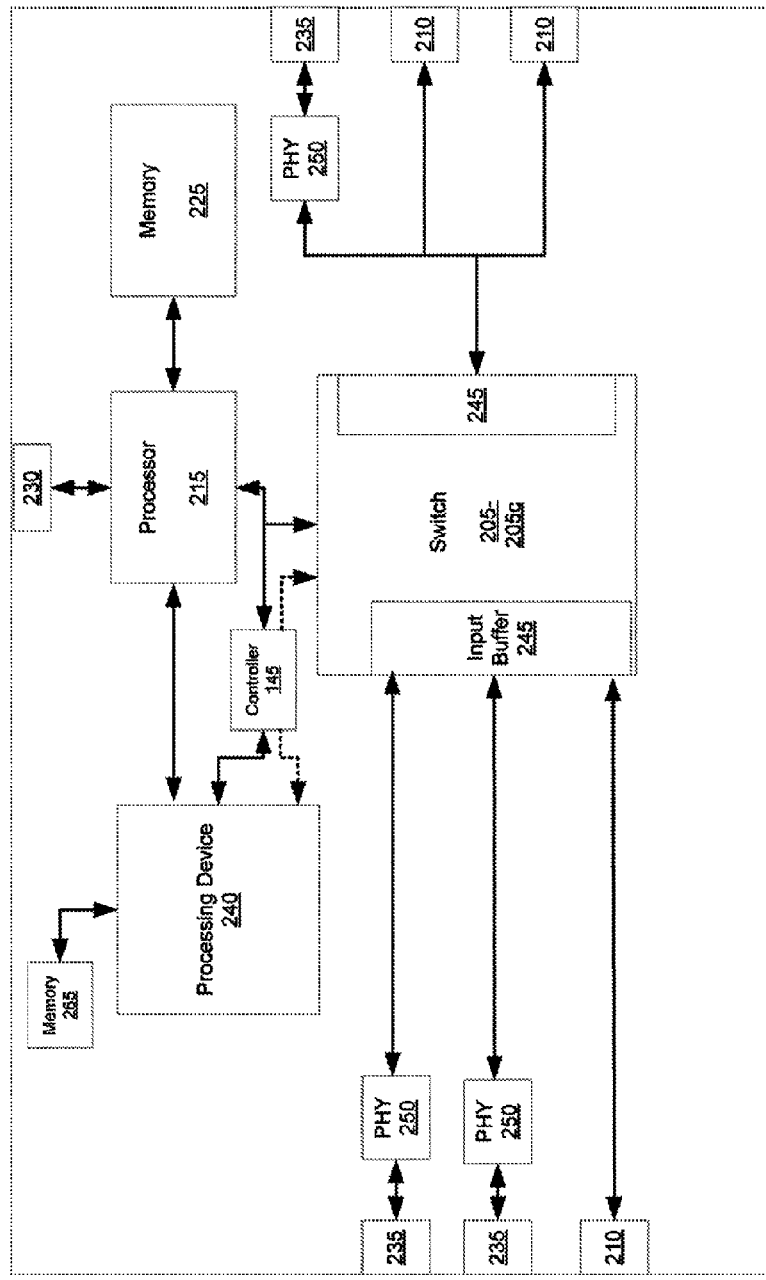

FIG. 2C is a block diagram illustrating an exemplary in-line network device 130c with internal switch routing such that processing device 240 is not placed in-line between switch 205-205c and bi-directional port 210 or bi-directional port 235/PHY 250 pair. Switch 205-205c may direct overflow packets through controller 145 and/or processing device 240 in the event of oversubscription or insufficient capacity at switch 205-205c to enable receipt of data packets or otherwise manipulate the data packets received by switch 205-205c.

The components of in-line network device 130c may include any number of bi-directional ports 210 and bi-directional port 235/PHY 250 pairs. Bi-directional ports 235 may be coupled to PHY 250. One or more bi-directional ports 210 or 235 may be configured as a monitoring and/or stacking port.

In-line network device 130c may also include switch 205-205c coupled to bi-directional port 235/PHY 250 pair and/or bi-directional port 210. Switch 205-205c may include one or more input buffers 245: Switch 205-205c may be coupled to processor 215. Switch 205-205c may be further coupled to controller 145 via a data path (shown in FIG. 2C as a solid line) and/or a control signaling path (shown in FIG. 2C as a dashed line). Processor 215 may be further coupled to management port 230 and memory 225. In some embodiments, switch 205-205c may include one or more input buffers 245. In-line network device 130c may also include processing device 240. Processing device 240 may be coupled to memory 265, controller 145, and/or processor 215. Processing device 240 may be coupled to controller 145 via a data path (shown in FIG. 2C as a solid line) and/or a control signaling path (shown in FIG. 2C as a dashed line). Further details regarding exemplary switches 205a-c and components included therein are provided below with regard to FIGS. 2D-2F.

Figure 2D:
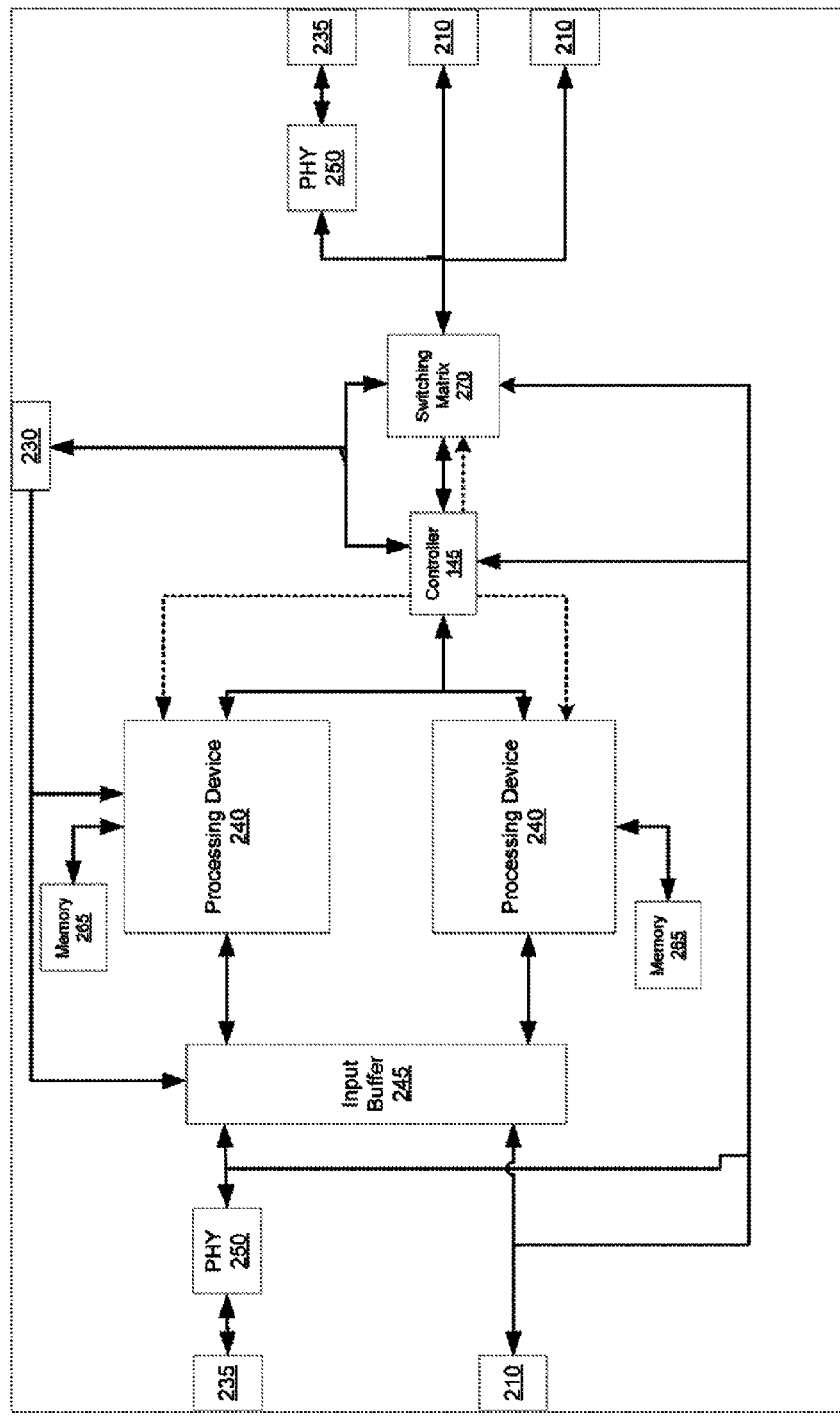
FIGS. 2D-2F are block diagrams illustrating exemplary switches, in accordance with embodiments of the present invention.

FIG. 2D is a block diagram illustrating an exemplary switch 205a that may operate as a stand-alone device in, for example, systems 100-102 or be included in one or more devices described herein. Some of the operations performed, and functionalities provided by, switch 205a may be similar to those of in-line network device 130a.

Switch 205a may include bi-directional ports 235 and/or 210. Bi-directional port 235 may be coupled to PHY 250 thus creating a bi-directional port 235/PHY 250 pair. In embodiments wherein switch 205a includes input buffer 245, PHY 250, bi-directional port 210, and/or bi-directional port 235/PHY 250 pair may be coupled indirectly to processing devices 240 and memories 265 via input buffer 245. Otherwise, bi-directional ports 210 and/or bi-directional port 235/PHY 250 pairs may be coupled directly to processing devices 240. Switch 205a may include a processing device 240 assigned to each bi-directional port 210 and/or bi-directional port 235/PHY 250 pair. Processing devices 240 may also be coupled to controller 145 via a data path (shown in FIG. 2D as a solid line) and/or a control signaling path (shown in FIG. 2D as a dashed line).

In some embodiments, switch 205a may include a management port 230 coupled to, for example, input buffer 245, processing device 240, controller 145, and/or switching matrix 270. Switch 205a may receive, for example, instructions executable by, for example, processing device 240, switching matrix 270, controller 145 and/or some combination thereof. In cases wherein input buffer 245 is capable of executing instructions, or is a so-called "smart buffer," instructions received via management port 230 may be executed by input buffer 245. Instructions received via management port 230 may be received from, for example, a user/administrator like user/administrator 155 or another component of systems 100-102.

Switching matrix 270 may be coupled to bi-directional port 210 and/or bi-directional port 235/PHY 250 pair. Switching matrix 270 may further be coupled to controller 145 via a data path (shown in FIG. 2D as a solid line) and/or a control signaling path (shown in FIG. 2D as a dashed line). Switching matrix 270 may be operable to determine a final destination of one or more data packets included in a traffic flow of data packets and forward the one or more data packets to a determined final destination via one or more bi-directional ports 210 and/or bi-directional port 235/PHY 250 pair.

On some occasions, for example, during non-congested operating conditions, one or more processing devices 240 and/or memories 265 may not be enabled, thus allowing ingressing data packets to be passed directly from bi-directional port 210 and/or bi-directional port 235 and PHY 250 to controller 145 and/or switching matrix 270. Disabling of processing device 240 and/or memory 265 may be executed by, for example, controller 145 via the control signaling path.

Figure 2E:
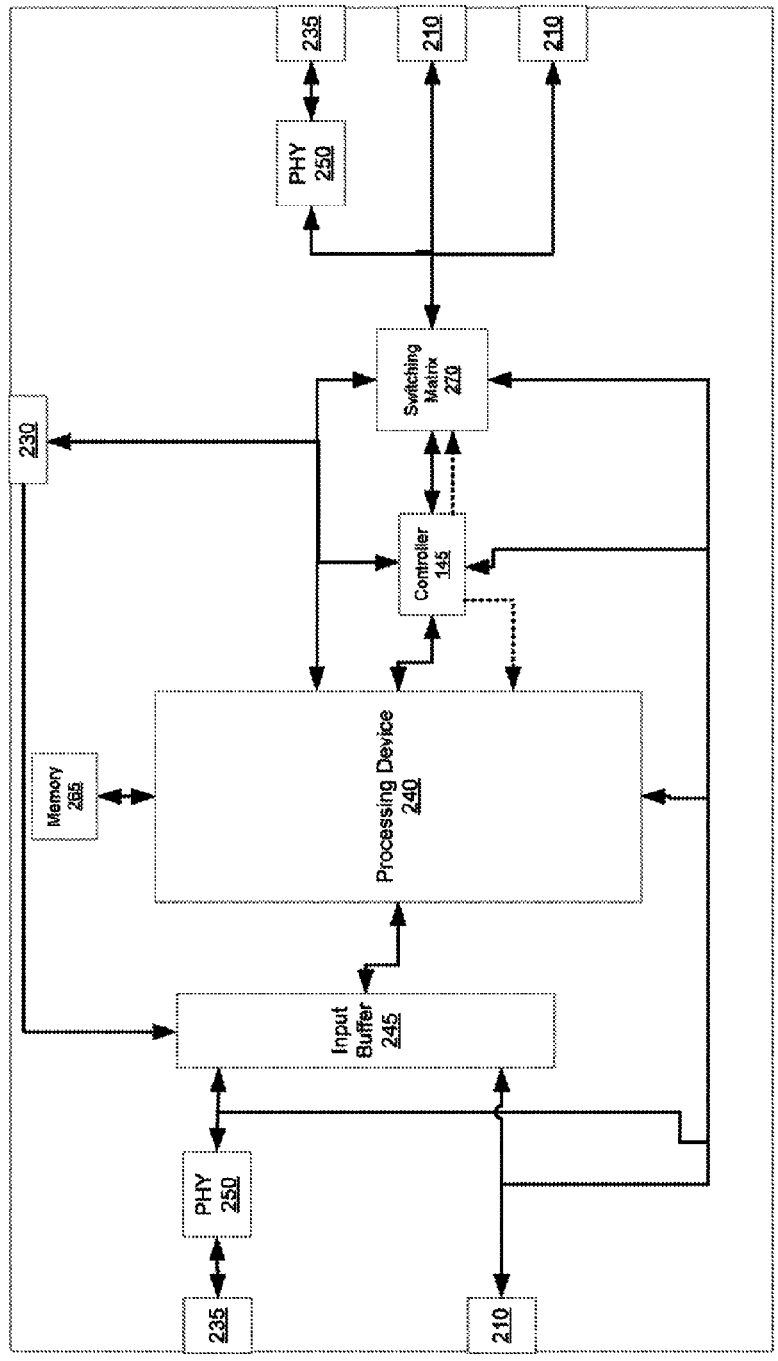

FIG. 2E is a block diagram illustrating another exemplary switch 205b that may operate as a stand-alone device in, for example, systems 100-102 or be included in one or more devices described herein. The operation of, and/or components included in, switch 205b may be similar to that of switch 205a and in-line network device 130b.

Switch 205b may include bi-directional ports 235 and/or 210. Bi-directional port 235 may be coupled to PHY 250 thus creating a bi-directional port 235/PHY 250 pair. In embodiments wherein switch 205b includes input buffer 245, PHY 250, bi-directional port 210, and/or 235 may be coupled indirectly to processing device 240 and memory 265 via input buffer 245. Otherwise, bi-directional ports 210 and/or bi-directional port 235/PHY 250 pairs may be coupled directly to processing device 240. Processing device 240 may also be coupled to controller 145 via a data path (shown in FIG. 2E as a solid line) and/or a control signaling path (shown in FIG. 2E as a dashed line). Controller 145 may also be coupled to switching matrix 270 via a data path (shown in FIG. 2E as a solid line) and/or a control signaling path (shown in FIG. 2E as a dashed line).

In switch 205b, multiple bi-directional ports 235 and 210 of switch 205b may share processing device 240 and/or memory 265. Sharing processing device 240 and/or memory 265 between multiple bi-directional ports 235 and 210 provides an advantage of decreasing the number of overall components required for switch 205b when compared with switch 205a. Thus, switch 205b has a design that may decrease the complexity of programming and managing switch 205b, relative to switch 205a. Possible advantages of the configuration of switch 205a when compared with switch 205b include the ability to use processing devices 240 and memories 265 of a smaller size/lower cost than those used for switch 205h.

In some embodiments, switch 205b may include a management port 230 coupled to, for example, input buffer 245, processing device 240, controller 145, and/or switching matrix 270. Switch 205b may receive, for example, instructions executable by, for example, processing device 240, switching matrix 270, and/or controller 145. In cases wherein input buffer 245 is capable of executing instructions, or is a so-called "smart buffer," instructions received via management port 230 may be executed by input buffer 245. Instructions received via management port 245 may be received from a user/administrator like user/administrator 155 or another component of systems 100-102.

On some occasions, for example, during non-congested operating conditions, processing device 240 and/or memory 265 may not be enabled, thus allowing ingressing data packets to be passed directly from bi-directional port 210 and/or bi-directional port 235 and PHY 250 to controller 145 and/or switching matrix 270. Disabling of processing device 240 and/or memory 265 may be executed by, for example, controller 145 via the control signaling path.

Figure 2F:
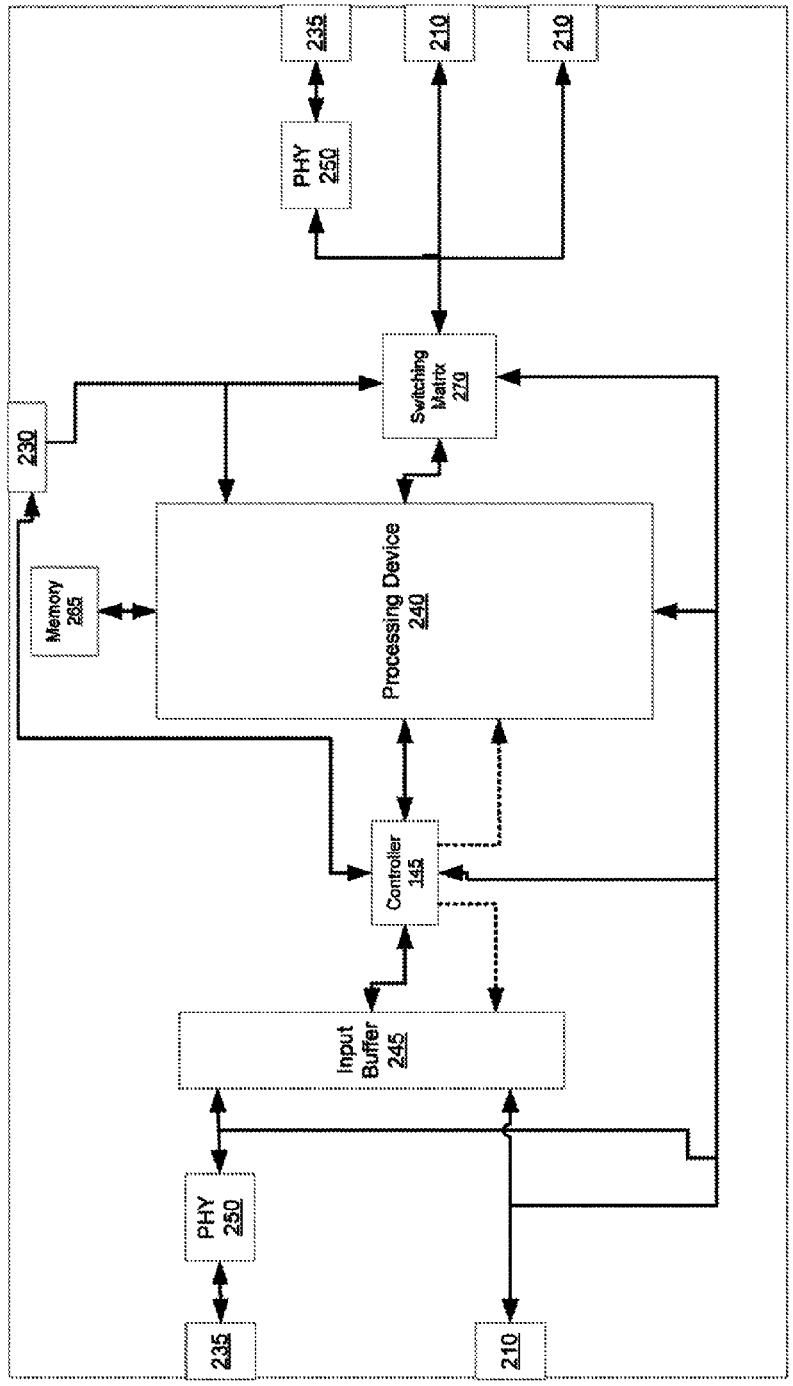

FIG. 2F is a block diagram illustrating an exemplary switch 205c that may operate as a stand-alone device in, for example, systems 100-102 or be included in one or more devices described herein. The operation of, and/or components included in, switch 205c may be similar to that of switches 205a and 205b and in-line network device 130c.

Switch 205c may include bi-directional ports 235 and/or 210. Bi-directional port 235 may be coupled to PHY 250 thereby forming a bi-directional port 235/PHY 250 pair. In embodiments wherein switch 205c includes input buffer 245, bi-directional port 235/PHY 250 pair and/or bi-directional port 210 may be coupled input buffer 245.

In switch 205c, controller 145 is placed inline between bi-directional ports 210, bi-directional port 235/PHY 250 pair, or input buffer 245 and processing device 240 such that controller 145 directs overflow packets to processing device 240 in the event of, for example, oversubscription or insufficient available capacity at switch 205c and/or input buffer 245 for incoming data packets. Controller may be coupled to input buffer 245 and/or processing device 240 via a data path (shown in FIG. 2F as a solid line) and/or a control signaling path (shown in FIG. 2F as a dashed line).

Switching matrix 270 may be coupled to processing device 240, PHY 250, bi-directional port 210 and/or bi-directional port 235. Switching matrix 270 may be operable to determine a final destination of one or more data packets included in a data stream of data packets and forward the one or more data packets to a determined final destination via one or more bi-directional ports 210 and/or bi-directional port 235/PHY 250 pair.

In some embodiments, switch 205c may include a management port 230 coupled to, for example, input buffer 245, processing device 240, controller 145, and/or switching matrix 270. Switch 205c may receive, for example, instructions executable by, for example, processing device 240, switching matrix 270, and/or controller 145 via management port 230. In cases wherein input buffer 245 is capable of executing instructions, or is a so-called "smart buffer," instructions received via management port 230 may be executed by input buffer 245. Instructions received via management port 230 may be received from a user/administrator, like user/administrator 155, or another component of systems 100-102.

On some occasions, for example, during non-congested operating conditions, processing device 240 and/or memory 265 may not be enabled, thus allowing ingressing data packets to be passed directly from bi-directional port 210 and/or bi-directional port 235 and PHY 250 to controller 145 and/or switching matrix 270. Disabling of processing device 240 and/or memory 265 may be executed by, for example, controller 145 via the control signaling path.

Figure 3A:
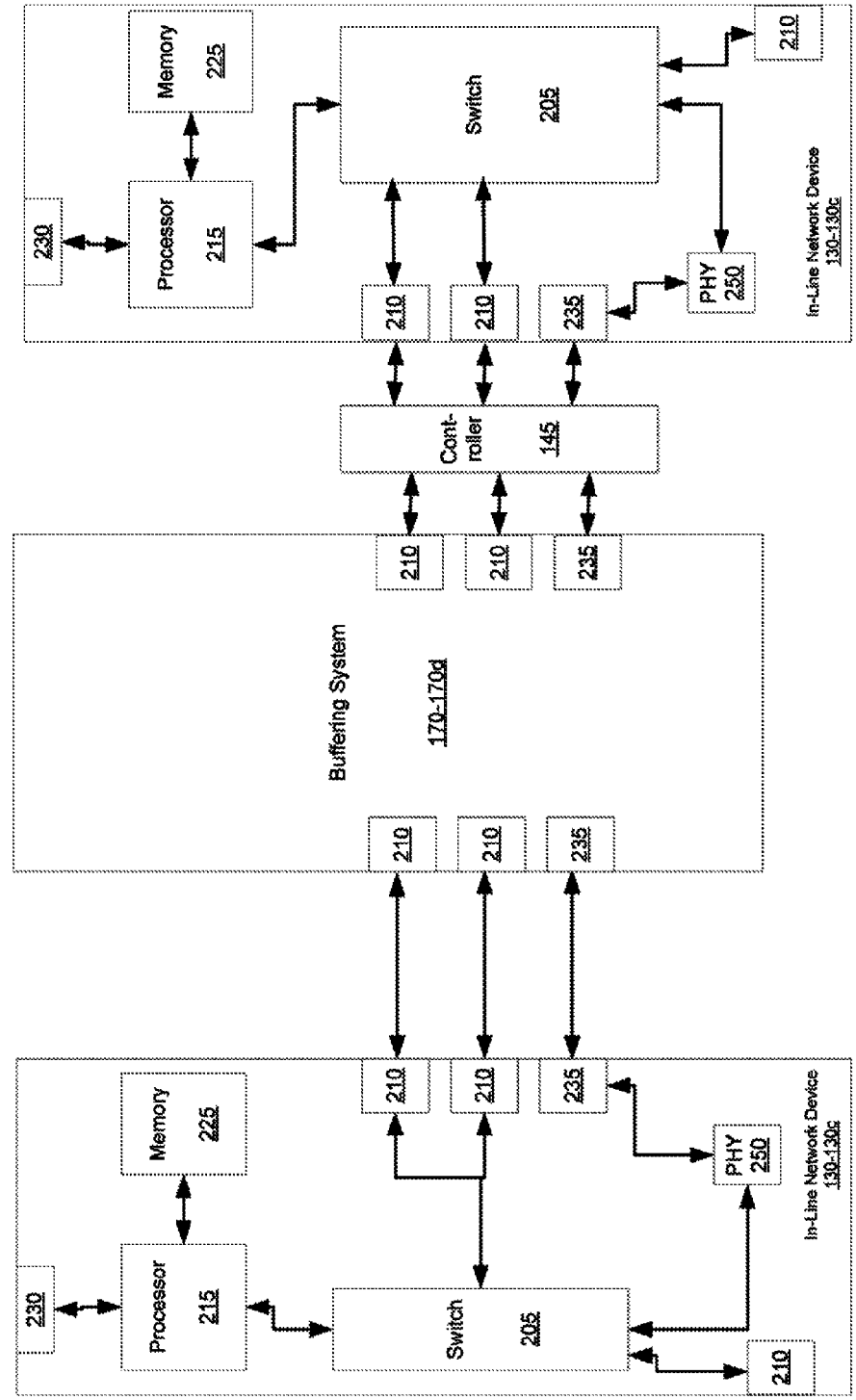
FIG. 3A is a block diagram illustrating exemplary network communication system including a stand alone buffering system, in accordance with embodiments of the present invention.

FIG. 3A is a block diagram illustrating an exemplary system 300 including a stand-alone buffering system 170-170d located in-line between two in-line network devices 130-130c. Buffering system 170-170d may be, for example, in-line serially, or in-parallel, with one or more in-line network devices 130-130c.

In-line network devices 130-130c may include management port 230 coupled to processor 215. Processor 215 may be coupled to memory 225 and switch 205-205c. Switch 205-205c may be coupled to one or more bi-directional ports 210 and/or PHYs 250. PHY 250 may be coupled to bi-directional port 235.

Buffering system 170-170d may operate to provide a virtual buffer that may be added to an existing product or data packet switch (e.g. an Ethernet switch) or may be used in conjunction with an additional data packet switch. Buffering system 170-170d may support bi-directional buffering for both ingressing and egressing traffic. The operation of buffering system 170-170d may be implemented via an instruction to implement a traffic flow control measure such as a pause frame feature. In one embodiment, buffering system 170-170d includes a high-priority buffer for storing data packets that are prioritized high.

In some embodiments, buffering system 170-170d may be physically, logically, and/or electrically located between the physical layer of in-line network device 130-130c and a switch resident in, for example, another in-line network device 130-103c, and may operate to buffer the switch's ingoing and outgoing traffic. In some cases buffering system 170-170d may be physically, logically, and/or electrically located between an existing physical layer, encoding chips and a switch resident in, for example, another in-line network device 130-103c, and may operate to buffer the switch's ingoing and outgoing traffic.

Optionally, system 300 may include one or more controllers 145. Controller 145 may control the flow of data packets between one or more in-line network devices 130-130c and buffering system 170-170d.

Figure 3B:
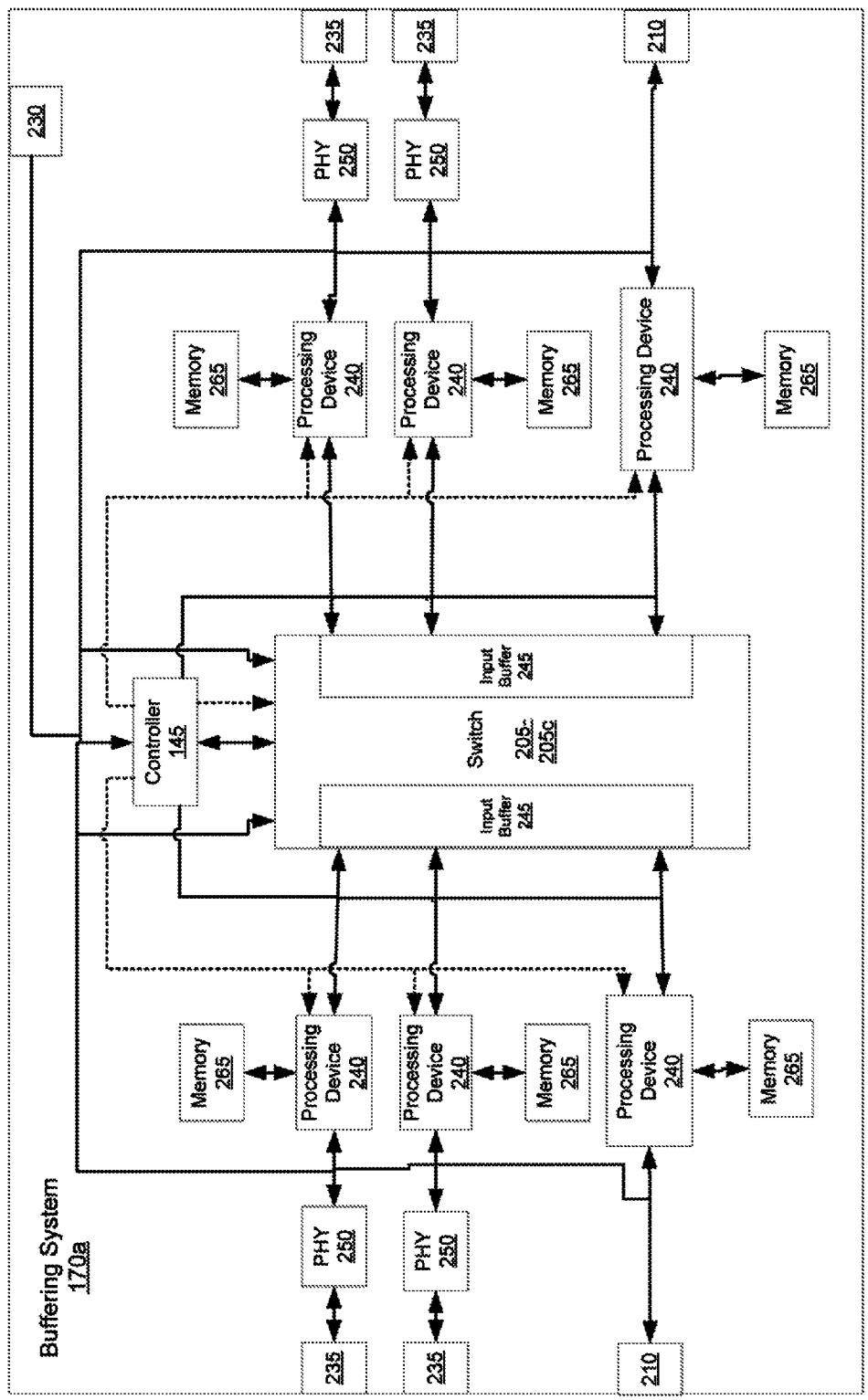
FIGS. 3B-3E are block diagrams illustrating components included in exemplary stand alone buffering systems, in accordance with embodiments of the present invention.

FIG. 3B is a block diagram illustrating components included in an exemplary buffering system 170a. Buffering system 170a includes a first set of components comprising multiple bi-directional ports 210 and 235, PHYs 250, processing devices 240, and memories 265. Bi-directional ports 235 may be paired with PHYs 250. Each bi-directional port 210 and bi-directional port 235/PHY 250 pair of buffering system 170a is coupled with its own processing device 240 and memory 265 which are coupled with switch 205-205c. Switch 205-205c may include one or more input buffers 245 for optionally buffering the traffic incoming to switch 205-205c. Optionally, buffering system 170a includes controller 145 coupled to one or more processing devices 240 and/or switch 205-205c via a data path (shown in FIG. 3B as a solid line) and/or a control signaling path (shown in FIG. 3B as a dashed line). Controller 145 may operate to control a traffic flow of data packets to and/or from switch 205-205c and/or input buffer 245 via, for example, a control signal transmitted via control signaling path.

On some occasions, buffering system 170a may include two sets of components located on, for example, either side of switch 205-205c. The second set of components may be a mirror image of the first set and may include processing devices 240 and memories 265 coupled to switch 205-205c such that each bi-directional port 210 and/or PHY 250/bi-directional port 235 pair is coupled to a different processing device 240 and memory 265.

Buffering system 170a may also include a management port 230 via which one or more instructions may be received from, for example, user/administrator 155. Received instructions may be executed by buffering system 170a or any component or combination of components included in buffering system 170a.

On some occasions, for example, during non-congested operating conditions, one or more processing devices 240 and/or memories 265 may not be enabled, thus allowing ingressing data packets to be passed directly from bi-directional port 210 and/or bi-directional port 235 and PHY 250 to controller 145 and/or switch 205-205c. Disabling of processing device 240 and/or memory 265 may be executed by, for example, controller 145 via the control signaling path.

Figure 3C:
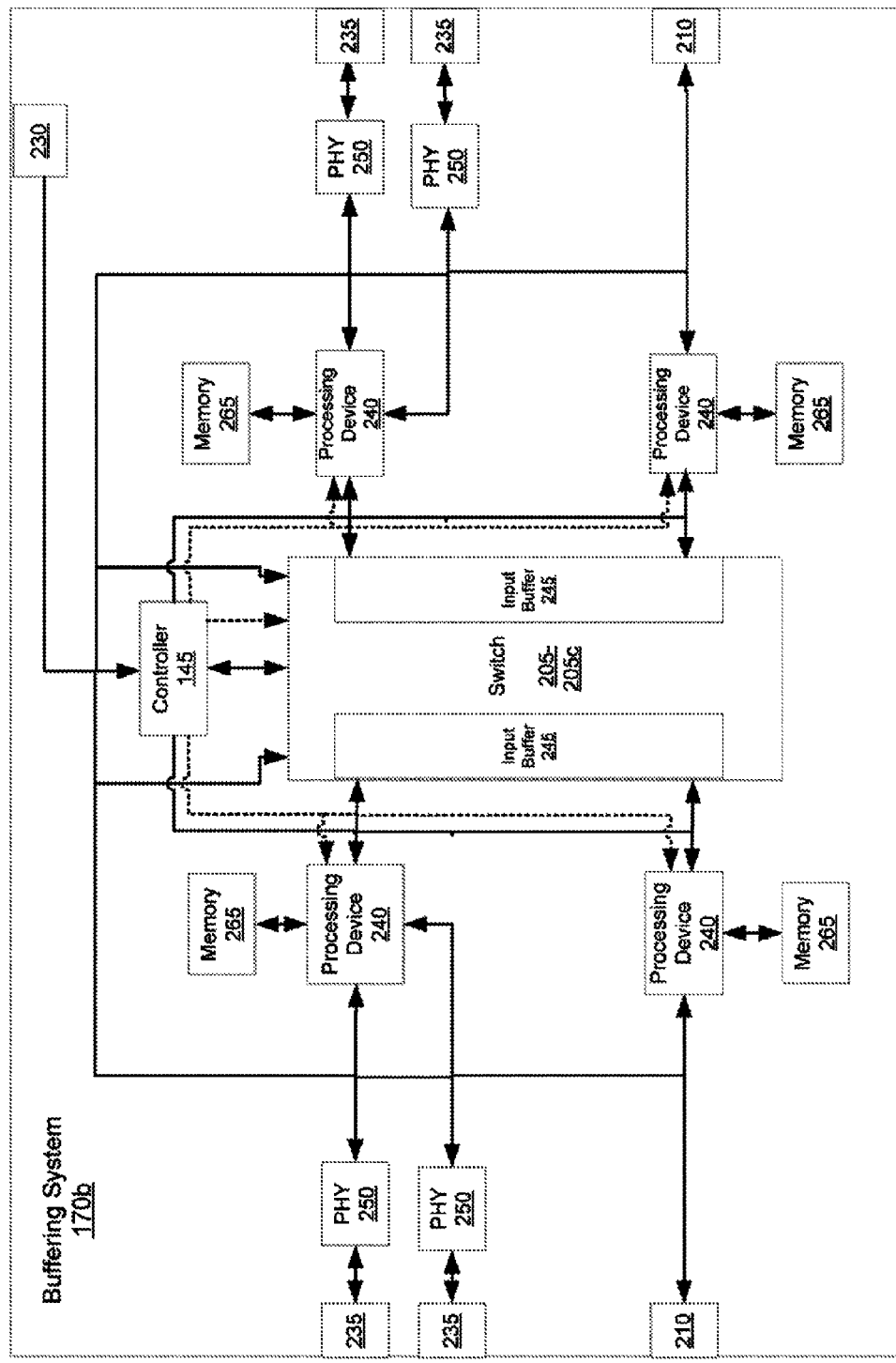

FIG. 3C is a block diagram illustrating components included in an exemplary buffering system170b. Buffering system 170b may include a first set of components comprising multiple pairs of copper media bi-directional ports 235/PHY 250 that share processing device 240 and memory 265 and fiber media bi-directional port 210 that is coupled to an individual processing device 240 and memory 265. In embodiments including multiple fiber media bi-directional ports 210, the fiber media bi-directional ports 210 may share a processing device 240 and a memory 265, be coupled to individual processing devices 240 and memories 265, or some combination thereof.

Processing devices 240 may be coupled to switch 205-205c. Switch 205-205c may include one or more input buffers 245 for optionally buffering the traffic incoming to switch 205-205c. Optionally, buffering system 170b includes controller 145 coupled to one or more processing devices 240 and/or switch 205-205c via a data path (shown in FIG. 3C as a solid line) and/or a control signaling path (shown in FIG. 3C as a dashed line). Controller 145 may operate to control the traffic flow of data packets to and/or from switch 205-205c and/or input buffer 245 via, for example, a control signal transmitted via control signaling path.

On some occasions, buffering system 170b may include one or more additional sets of components. An additional set of components may be located on a side of buffering system 170-170d opposite to the first set of components and may be a mirror image of the first set. Additional sets of components may include processing devices 240 and memories 265 coupled to switch 205-205c such that each bi-directional port 210 and/or PHY 250/bi-directional port 235 pair in the additional set of components is coupled to a different processing device 240.

Buffering system 170b may also include a management port 230 via which one or more instructions may be received from, for example, user/administrator 155. Received instructions may be executed by buffering system 170b or any component or combination of components included in buffering system 170b.

On some occasions, for example, during non-congested operating conditions, one or more processing devices 240 and/or memories 265 may not be enabled, thus allowing ingressing data packets to be passed directly from bi-directional port 210 and/or bi-directional port 235 and PHY 250 to controller 145 and/or switch 205-205c. Disabling of processing device 240 and/or memory 265 may be executed by, for example, controller 145 via the control signaling path.

Figure 3D:
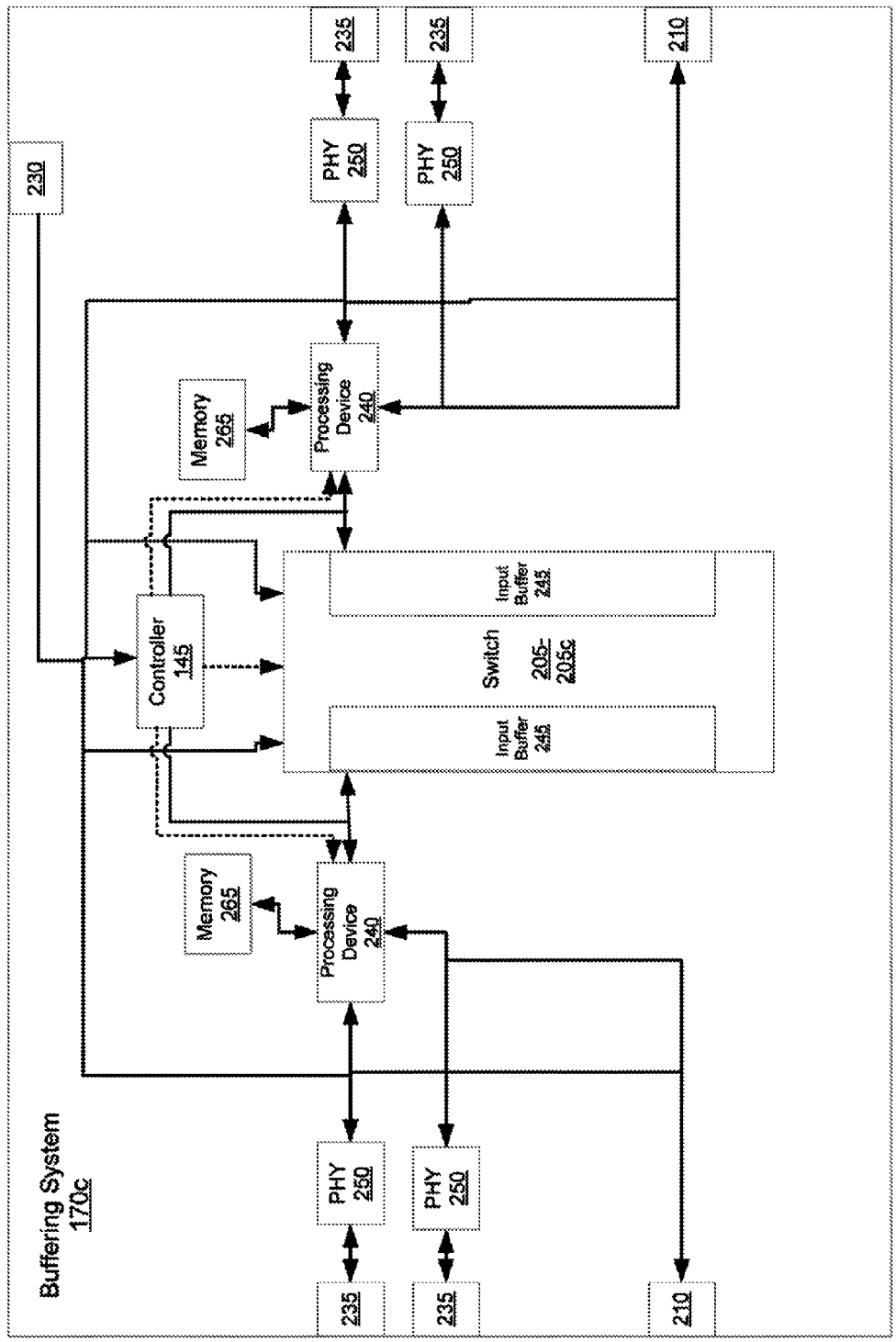

FIG. 3D is a block diagram illustrating components included in an exemplary buffering system 170c wherein bi-directional ports 210 and bi-directional port 235/PHY 250 pairs included in buffering system 170c share a processing device 240 and a memory 256. Buffering system 170c may include a first set of components comprising processing device 240 and memory 265 that may be coupled to switch 205-205c. Switch 205-205c may include one or more input buffers 245 for optionally buffering the traffic incoming to switch 205-205c.

Optionally, buffering system 170c includes controller 145 coupled to one or more processing devices 240 and/or switch 205-205c via a data path (shown in FIG. 3D as a solid line) and/or a control signaling path (shown in FIG. 3D as a dashed line). Controller 145 may operate to control the traffic flow of data packets to and/or from switch 205-205c and/or input buffer 245 via, for example, a control signal transmitted via control signaling path.

On some occasions, buffering system 170c may include one or more additional sets of components. An additional set of components may be located on a side of buffering system 170-170d opposite to the first set of components and may be a mirror image of the first set. Additional sets of components may include processing devices 240 and memories 265 coupled to switch 205-205c such that each bi-directional port 210 and/or PHY 250/bi-directional port 235 pair is coupled to a different processing device 240 and memory 265.

Buffering system 170c may also include a management port 230 via which one or more instructions may be received from, for example, user/administrator 155. Received instructions may be executed by buffering system 170c or any component or combination of components included in buffering system 170c.

On some occasions, for example, during non-congested operating conditions, one or more processing devices 240 and/or memories 265 may not be enabled, thus allowing ingressing data packets to be passed directly from bi-directional port 210 and/or bi-directional port 235 and PRY 250 to controller 145 and/or switch 205-205c. Disabling of processing device 240 and/or memory 265 may be executed by, for example, controller 145 via the control signaling path.

Figure 3E:
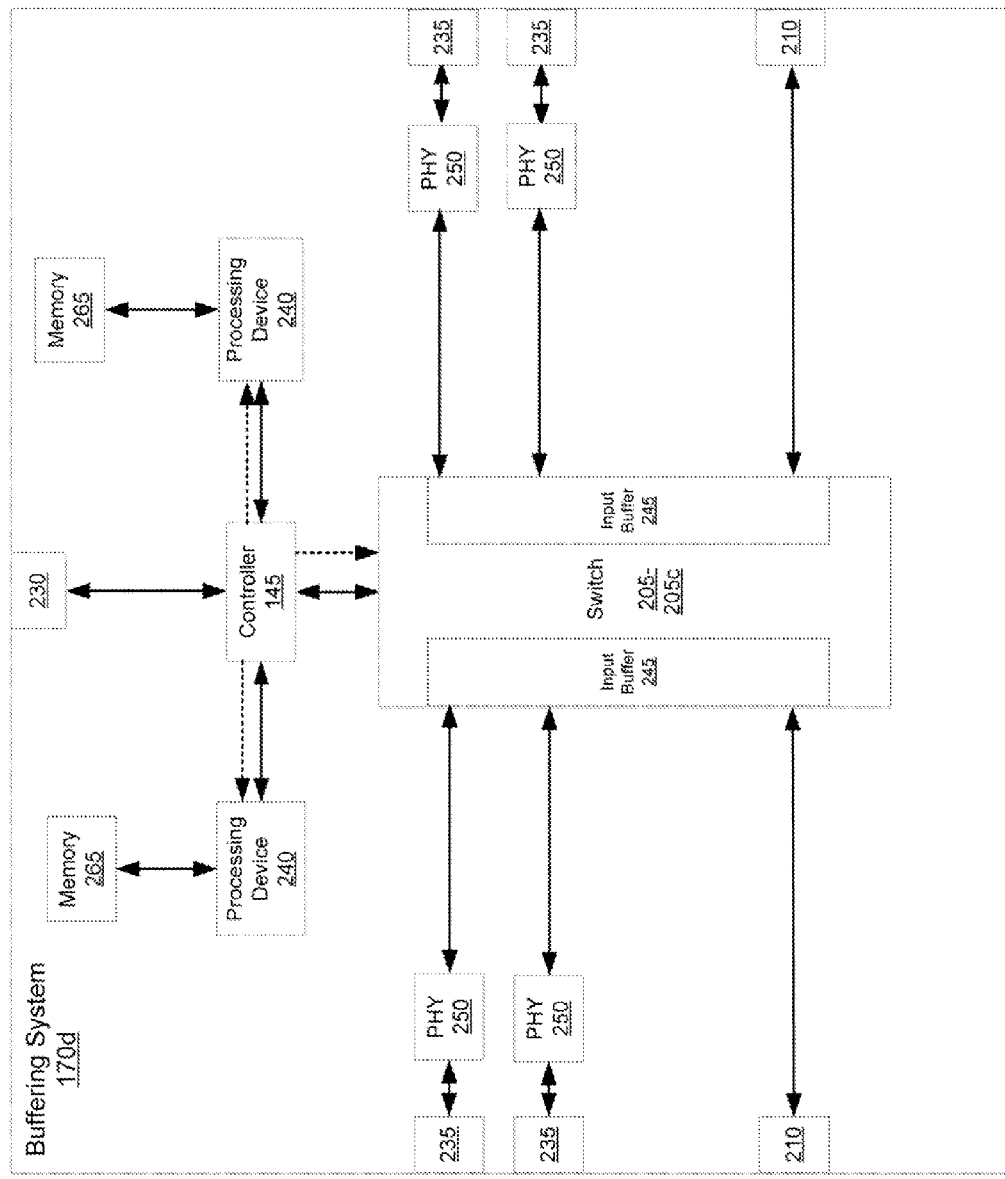

FIG. 3E is a block diagram illustrating components included in an exemplary buffering system 170d. Buffering system 170d may include a first set of components comprising multiple pairs of copper media bi-directional ports 235/PHY 250, processing device 240, and memory 265. Buffering system 170d may include switch 205-205c located in-line with bi-directional ports 235/PHY 250 pairs and bi-directional port 210. Buffering system 170d may also include controller 145 coupled to one or more processing devices 240 and/or switch 205-205c via a data path (shown in FIG. 3E as a solid line) and/or a control signaling path (shown in FIG. 3E as a dashed line). Controller 145 may operate to control the traffic flow of data packets to and/or from switch 205-205c and/or input buffer 245 via, for example, a control signal transmitted via control signaling path and also with controller 145, such that controller 145 may directly manage communication between bi-directional ports 235 and 210 and processing device 240.

Processing devices 240 may be further coupled to memory 265. Switch 205-205c may include one or more input butlers 245 for optionally buffering the traffic incoming to switch 205-205c.

On some occasions, buffering system 170d may include one or more additional sets of components. An additional set of components may be located on a side of buffering system 170-170d opposite to the first set of components and may be a mirror image of the first set. Additional sets of components may include processing devices 240 and memories 265 coupled to switch 205-205c such that each bi-directional port 210 and/or PHY 250/bi-directional port 235 pair is coupled to a different processing device 240 and memory 265.

Buffering system 170d may also include a management port 230 via which one or more instructions may be received from, for example, user/administrator 155. Received instructions may be executed by buffering system 170d or any component or combination of components included in buffering system 170d.

Figure 4:
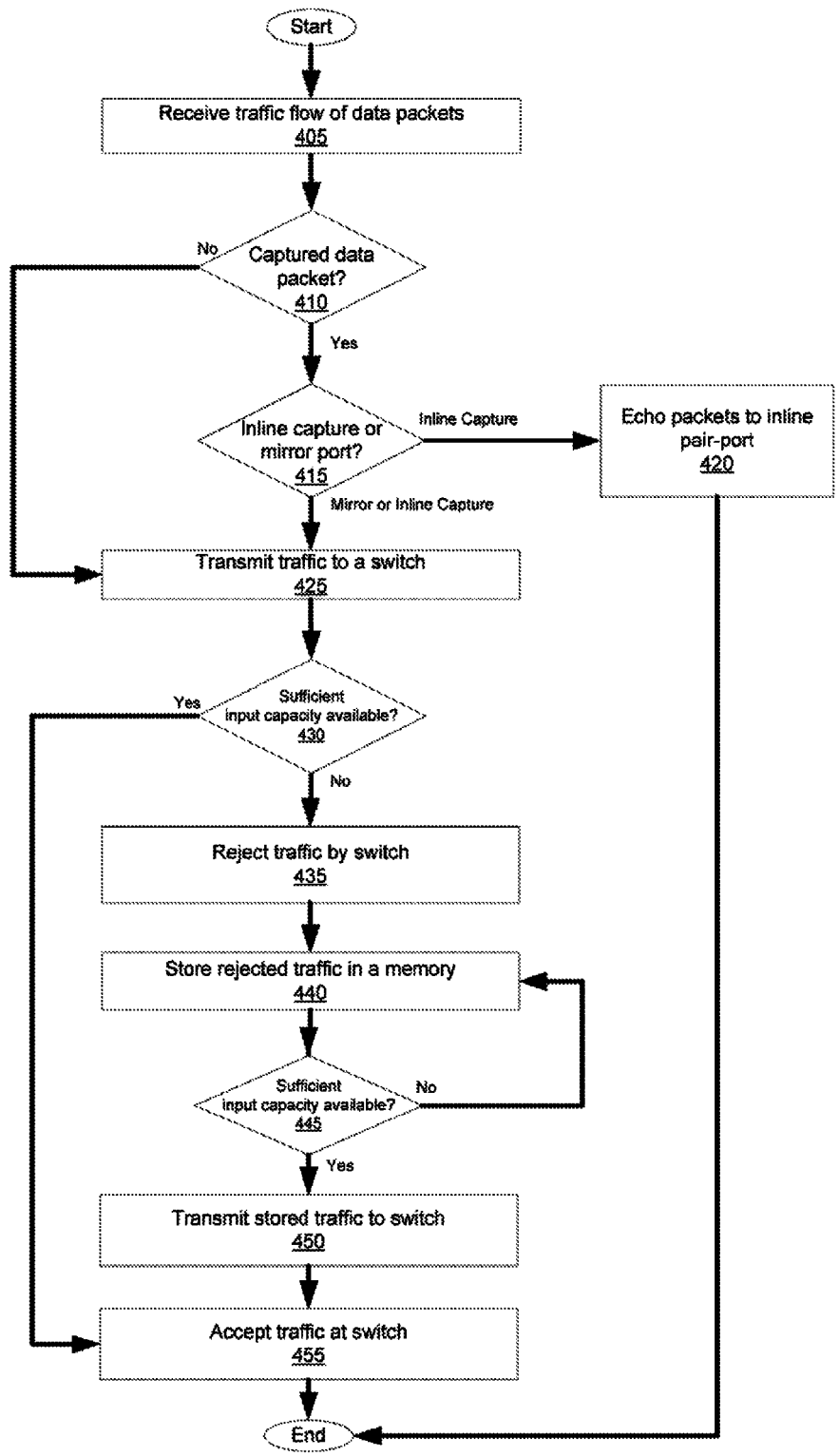
FIG. 4 is a flowchart illustrating an exemplary process for transmitting data packets in a communication system, in accordance with an embodiment of the present invention.

FIG. 4 illustrates a process 400 for transmitting traffic to a switch in a network communication system. Process 400 may be performed by, for example, systems 100, 101, 102, and/or 300, in-line network devices 130-130c, switches 205-205c, processing device 240, memory 265, buffering systems 170-170d, and/or any combination thereof.

First, at step 405, a traffic flow of data packets may be received by, for example, a data packet receiving entity, such as a network communication system like system 100, an in-line network device like in-line network devices 130-130c, a switch like switches 205-205c, a buffering system like buffering systems 170d, and/or a processing device like processing device 240. The traffic flow of data packets may be received at a rate of for example, one Gigabit per second, ten Gigabits per second, 40 Gigabits per second, 40 Gigabits per second via dense wavelength-division multiplexing, and/or 100 Gigabits per second. The traffic flow of data packets may be received via, for example, a bi-directional port like fiber media bi-directional port 210 and/or copper media bi-directional port 235.

Then, at step 410, it may be determined whether the received data packets are captured data packets such as may be received when in-line network device 130-130c is, for example, a network captured traffic distribution device or a network tap. In such embodiments, the traffic flow of captured data packets may be received via, for example, a mirror port like mirror port 160 and/or a traffic capture point located along a communication link between two communicating devices like traffic capture point 165.

When the traffic flow includes captured data packets, it may be further determined whether a captured data packet is received via the in-line capture point or the mirror port (step 415). When a captured data packet is received via an in-line capture point, the captured data packet may be echoed to an in-line pair-port resident in, for example, in-line network device 130-130c (step 420). In some embodiments, an in-line pair-port may be a bi-directional port resident in, for example, an in-line network device, like bi-directional ports 210 and 235.

When the data packets are not captured or when captured, whether they are received via a mirror port or in-line capture point, the receiving entity may transmit traffic to a switch, such as switch 205-205c (step 425). Then, at step 430, it may be determined whether the switch has sufficient input capacity available to enable receipt of the transmitted data packets. Step 430 may be executed by, for example the switch, an input buffer like input buffer 245, a controller like controller 145, and/or a buffering system like buffering system 170-170d. Step 430 may include, for example, determining the current level of traffic being transmitted to and/or received by the switch, measuring the available input and/or output capacity of the switch, monitoring the status of the switch, determining the traffic flow rate of the data packets being transmitted to the switch, and/or receiving a message at the transmitting entity indicating whether input capacity at the switch is sufficient to enable receipt of transmitted data packets. In embodiments wherein the switch includes an input buffer, such as input buffer 245, the determination of step 430 may include determining the available input capacity of the input buffer, measuring the number of data packets being buffered, or stored, in the input buffer, and/or monitoring the status of the input buffer.

When the input capacity available at the switch is sufficient to enable receipt of the transmitted data packets, then the transmitted data packets may be accepted at the switch (455) and process 400 may end. When the input capacity available at the switch is not sufficient to enable receipt of some or all of the transmitted data packets, the transmitted data packets may be rejected by the switch (435). In some embodiments, step 435 may include implementation of a traffic flow control measure. Further details regarding traffic flow control measures are provided below with reference to FIGS. 5, 6, and 7. In some embodiments, step 445 may be executed by a processing device such as processing device 240. Optionally, in step 440 the rejected traffic flow of data packets may be stored in a memory such as memory 265 and/or a buffering system such as buffering systems 170-170d.

After a pre-determined, random, or pseudo-random interval of time has elapsed, for example, one second, one millisecond, or one nanosecond it may again be determined whether input capacity available at the switch is sufficient to enable receipt of the transmitted data packets at the switch (step 445). Step 445 may include receipt of a message indicating whether input capacity is available at the switch. Step 445 may also include receipt of a message by the transmitting entity which, when received and interpreted, indicates whether input capacity available at the switch is sufficient to enable receipt of the transmitted data packets at the switch.

When sufficient input capacity is not available at the switch, the traffic flow of data packets may be stored, or may be continued to be stored in a memory like memory 265 and/or a buffering system such as buffering systems 170-170d. When sufficient input capacity is available, the stored traffic may be accessed by, for example, a processing device, like processing device 240 and/or a controller like controller 145 and transmitted to the switch (step 450). Following step 450, traffic may be accepted at the switch (step 455) and process 400 may end.

Figure 5:
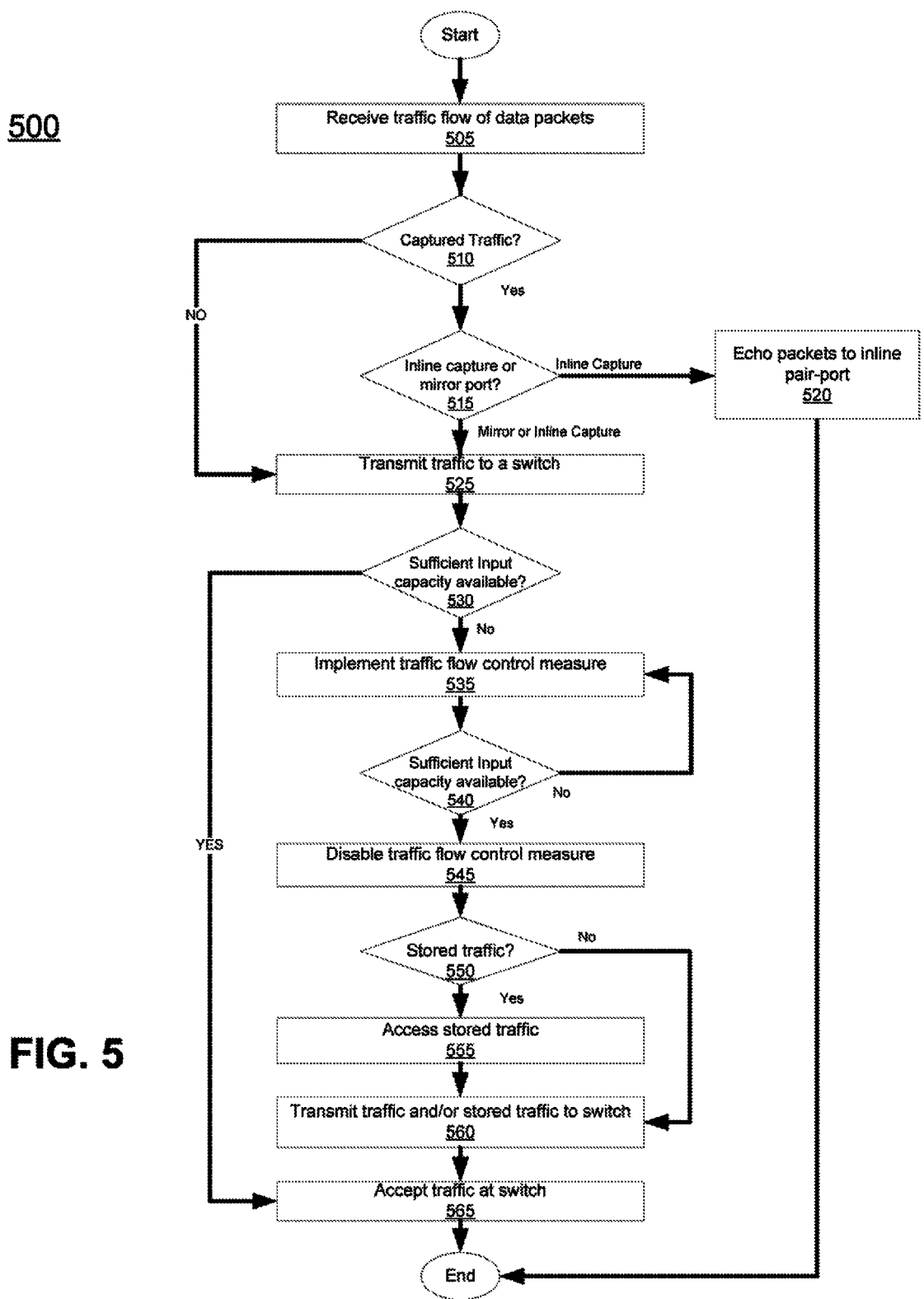
FIG. 5 is a flowchart illustrating an exemplary process for transmitting data packets in a communication system and using a traffic flow control measure, in accordance with an embodiment of the present invention.

FIG. 5 illustrates a process 500 for transmitting traffic to a switch in a network communication system. Process 500 may be performed by, for example, systems 100, 101, 102, and/or 300, in-line network devices 130-130c, switches 205-205c, processing device 240, memory 265, buffering systems 170-170d, and/or any combination thereof.

First, in step 505, a traffic flow of data packets may be received by a data packet receiving entity, such as a network communication system like system 100, an in-line network device like in-line network devices 130-130c, a switch like switches 205-205c, a buffering system like buffering systems 170-170d, and/or a processing device like processing device 240. The traffic flow of data packets may be received at a rate of, for example, one Gigabit per second, ten Gigabits per second, 40 Gigabits per second, 40 Gigabits per second via dense wavelength-division multiplexing, and/or 100 Gigabits per second. The traffic flow of data packets may be received via, for example, a bi-directional port like fiber media bi-directional port 210 and/or copper media bi-directional port 235.

Next, in step 510, it may be determined whether the received data packets are captured data packets such as may be received when in-line network device 130-130c is, for example, a network captured traffic distribution device or a network tap. In these embodiments, the traffic flow of captured data packets may be received via, for example, a mirror port like mirror port 160 and/or a traffic capture point located along a communication link between two communicating devices like traffic capture point 165.

When the traffic flow includes captured data packets, it may be determined whether a captured data packet is received via the in-line capture point or the mirror port (step 515). When a captured data packet is received via an in-line capture point, the captured data packet may be echoed to an in-line pair-port resident in, for example, in-line network device 130-130c (step 520). In some embodiments, an in-line pair-port may be a bi-directional port resident in, for example, an in-line network device, like bi-directional ports 210 and 235.

When the data packets are not captured or when captured, whether they are received via a mirror port or in-line capture point, in step 525, the receiving entity may transmit traffic to a switch, such as switch 205-205c. Then, in step 530, it may be determined whether the switch has sufficient input capacity available to enable receipt of the transmitted data packets. Step 530 may be executed by, for example the switch, an input buffer like input buffer 245, a controller like controller 145, and/or a buffering system like buffering system 170-170d. Step 530 may include, for example, determining the current level of traffic being transmitted to and/or received by the switch, measuring the available input and/or output capacity of the switch, monitoring the status of the switch, determining the traffic flow rate of the data packets being transmitted to the switch, and/or receiving a message at the transmitting entity indicating whether input capacity at the switch is sufficient to enable receipt of transmitted data packets. In embodiments wherein the switch includes an input buffer, such as input buffer 245, the determination of step 530 may include determining the available input capacity of the input buffer, measuring the number of data packets being buffered, or stored, in the input buffer, and/or monitoring the status of the input buffer.

When the input capacity available at the switch is sufficient to enable receipt of the transmitted data packets, then they may be accepted at the switch (565) and may be eventually transmitted to an external in-line communication device, such as communication device 110. Following step 565, process 500 may end.

When the input capacity available at the switch is not sufficient to enable receipt of some or all of the transmitted data packets, a traffic flow control measure may be implemented by, for example, the entity transmitting the traffic, the switch, an input buffer like input buffer 245, processing device 240, a buffering system like buffering systems 170-170*d*, a controller like controller 145, and/or a combination thereof (step 535). Implementation of the traffic control measure may serve to, for example, limit, filter, pause, stop, and/or otherwise control the flow of traffic to the switch. In some cases, implementation of the traffic control measure may include hardware toggling via, for example, the controller. Further details regarding exemplary implemented traffic control measures are provided below with reference to FIGS. 6 and 7.

After a pre-determined, random, or pseudo-random interval of time has elapsed it may be determined whether sufficient input capacity is available at the switch (step 540). In one embodiment, step 540 may include the transmission of a message to one or more of the transmitting entities indicating that the switch has available input capacity and/or instructions to resume transmission of traffic to the switch. When sufficient input capacity is not available, the traffic control measure may continue to be implemented. When sufficient input capacity is available, the traffic control measure may be disabled (step 545).

Then, in step 550, it may be determined whether the implemented traffic control measure includes the storage of data packets. When no data packets have been stored, the transmitting entity may transmit traffic to the switch (step 560). When data packets have been stored, they may be accessed by, for example, the transmitting entity (step 555), transmitted to the switch (560), and accepted at the switch (step 565). Step 560 may also include transmission of a traffic flow of data packets that have not been stored. Following step 565, process 500 may end.

Figure 6:
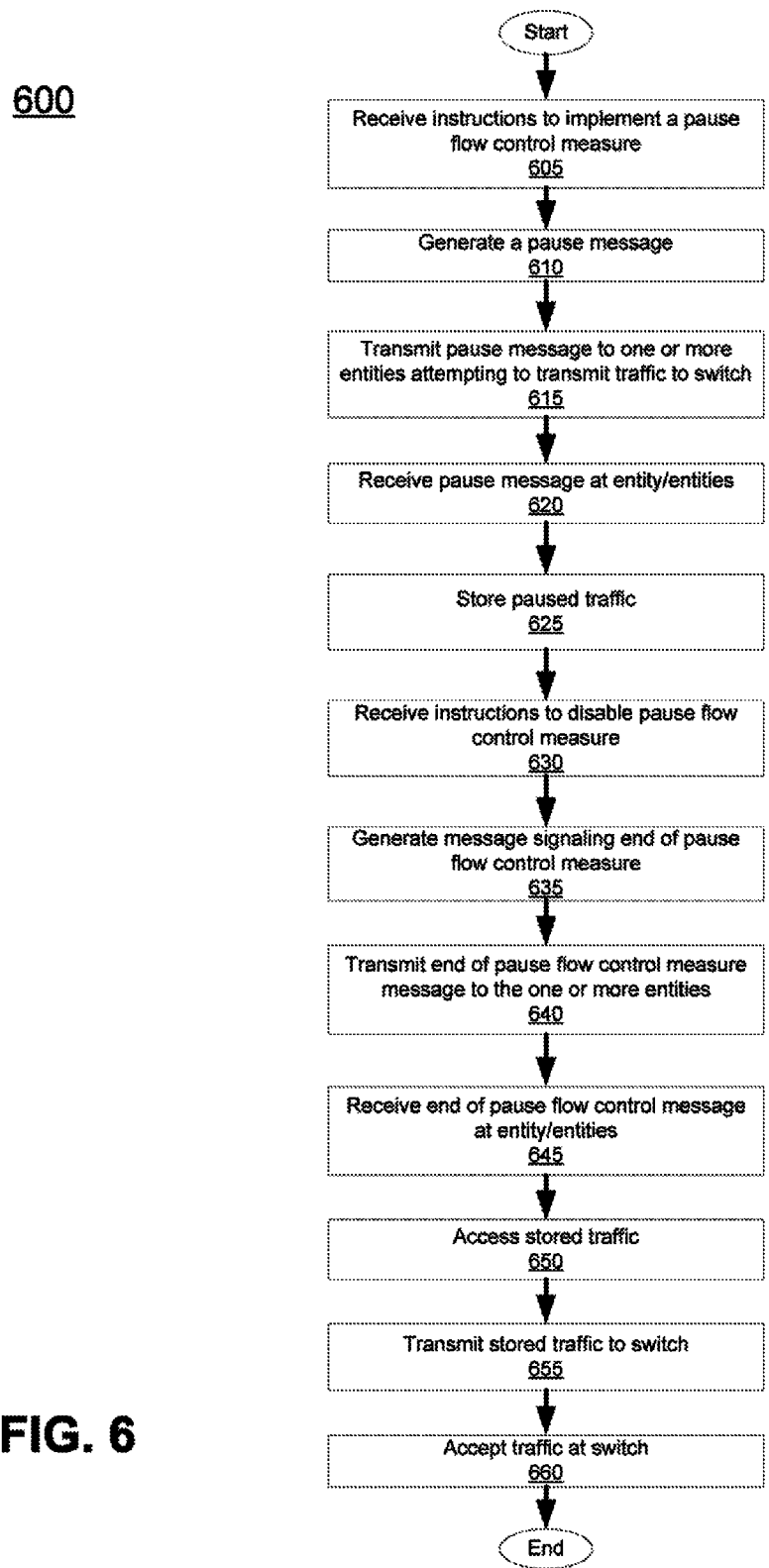
FIG. 6 is a flowchart illustrating an exemplary process for transmitting data packets in a communication system and using a pause message traffic flow control measure, in accordance with an embodiment of the present invention.

FIG. 6 is a flow chart depicting an exemplary process 600 for implementing a pause flow control measure. Process 600 may be performed by, for example, systems 100, 101, 102, and/or 300, in-line network devices 130-130*c*, switches 205-205*c*, processing device 240, memory 265, buffering systems 170-170*d*, and/or any combination thereof.

First, in step 605, instructions to implement a pause flow control measure may be received by, for example, data packet receiving entity, such as a network communication system like system 100, an in-line network device like in-line network devices 130-130*c*, a switch like3 switches 205-205*c*, a buffering system like buffering systems 170-170*d*, and/or a processing device like processing device 240. The instructions may be received from, for example, a switch, such as switch 205-205*c* an input buffer, such as input buffer 245, a controller, such as controller 145, a processing device, such as processing device 240, and/or a buffering system, such as buffering system 170-170*d*. In some embodiments, the instructions may also be received from an external device, such as, communication device 110 and/or in-line network device 130-130*c*. These instructions may be received from an external device when, for example, the external device is over-subscribed or is otherwise unable to accept the transmission of some or all of the data packets included in a traffic flow of data packets.

Then, in step 610, a pause message may be generated by, for example, the input buffer, the controller, and/or the buffering system. The pause message may be a data packet of any type so long as the entity receiving the pause message recognizes it as a pause message and/or serves to instruct the transmitting entity to pause its transmission of data packets to the switch. In some cases, the pause message may be compliant with a compliance standard for pause messages as detailed in, for example, IEEE standard number 802.3, or the like. In some cases, the pause message may include a counter value which may be used by the transmitting entity to determine how long to pause the transmission of data packets before resuming the transmission of data packets to a switch.

Next, in step 615, the generated pause message may be transmitted to one or more transmitting entities in communication with the switch. Exemplary transmitting entities include a communication device like communication device 110, an in-line network device like in-line network device 130-130*c*, and a processing device like processing device 240. The pause message may then be received and interpreted by the transmitting entity (step 620). In some cases, the pause message may be received, interpreted, and then disregarded by the transmitting entity. In some embodiments, the pause message may trigger the storage of data packets by the transmitting entity (step 625). The paused traffic may be stored in, for example, a memory, such as memory 265 or a buffering system, like buffering systems 170*d*.

Then, in step 630, instructions to disable the pause flow control measure may be received and/or the time period indicated by the counter value included in the pause message may expire. In cases where instructions to disable the pause flow control measure are be received, a message signaling the end of the pause flow control measure may be generated (step 635) and transmitted to the one or more entities communicatively coupled to the switch (step 640). Next, in step 645, the end of pause flow control message may be received at the transmitting entity. Any traffic stored as a result of the pause flow control measure may then be accessed by, for example, the transmitting entity, step 650, transmitted to the switch, step 655, and thereafter accepted at the switch, step 660. Following step 660 process 600 may end.

Figure 7:
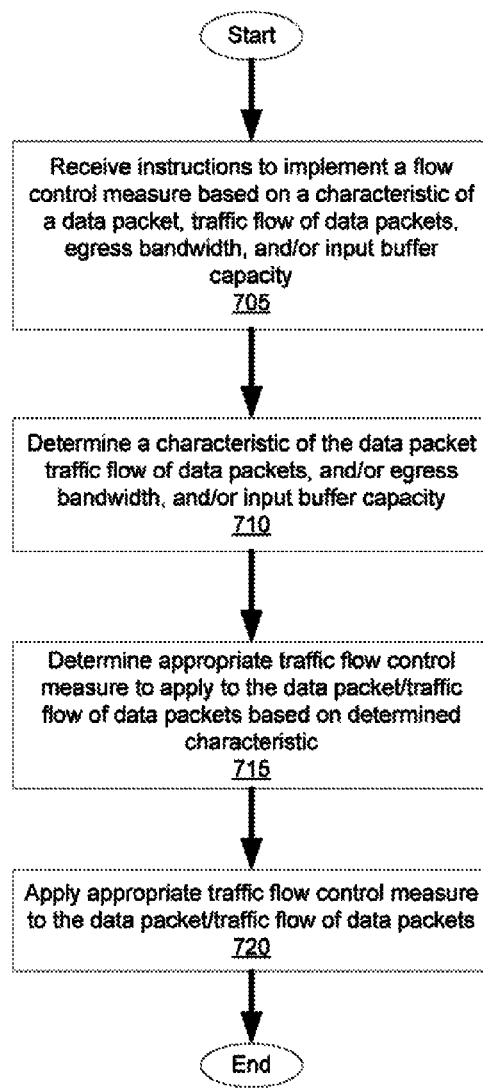
FIG. 7 is a flowchart illustrating an exemplary process for transmitting data packets in a communication system, determining a characteristic of a transmitted data packet, and implementing a pause message traffic flow control measure based on the determined characteristic, in accordance with an embodiment of the present invention.

FIG. 7 illustrates an exemplary process 700 for implementing a flow control measure based on one or more characteristics of a data packet included in a traffic flow data packets, a traffic flow of data packets, an amount of egress bandwidth available at the switch, and/or an amount of available input buffer capacity. Process 700 may be performed by, for example, systems 100, 101, 102, and/or 300, in-line network devices 130-130*c*, switches 205-205*c*, processing device 240, memory 265, buffering systems 170-170*d*, and/or any combination thereof.

First, in step 705, instructions to implement a flow control measure based on a characteristic of a data packet, a traffic flow of data packets, an amount of egress bandwidth available at a switch, and/or an amount of available input buffer capacity may be received by, for example, the switch, an input buffer of the switch such as input buffer 245, a controller such as controller 145, and/or a data transmission entity, such as a processing device like processing device 240, or a communication device such as communication device 110. In some cases, the instructions may be received from an external device, such as, communication device 110, routing device 120, and/or in-line network device 130-130*c*. These instructions may be received from an external device when, for example, the external device is over-subscribed or is otherwise unable to accept the transmission of some or all of the data packets included in a traffic flow of data packets. In some embodiments, step 705 may resemble step 605 as discussed above with regard to FIG. 6.

Next, in step 710, a characteristic of a data packet, a traffic flow data packets, an amount of egress bandwidth available at the switch, and/or an amount of available input buffer capacity may be determined. Exemplary characteristics of a data packet include the type of data packet (e.g. video, audio, text), the protocol used to encode the data packet, the size of the data packet, the origin of the data packet, the final destination of the data packet, and the duration of time the data packet has been stored in, for example, an input buffer like input buffer 245, a buffering system like buffering system 170-170d, and/or a memory like memory 265. Exemplary characteristics of a traffic flow of data packets include the rate or speed at which the data packets are received at the switch and the density data packets included in the traffic flow. Exemplary characteristics of an input buffer's available capacity include the number of data packets being buffered in the input buffer, the remaining capacity of the input buffer, and the egressing transmission capabilities of the input buffer. Exemplary characteristics of egress bandwidth include the amount of bandwidth available via the egress ports of the switch and the number of egress ports of the switch.

Then, in step 715, one or more appropriate traffic flow control measures to be applied to a data packet and/or a traffic flow of data packets may be based on one or more of the characteristics determined in step 710. When a characteristic determined in step 710 includes a characteristic of a data packet, exemplary appropriate traffic flow control measures that may be applied to the data packet include filtering, editing, truncating, and/or prioritizing the data packet based on the determined characteristic. For example, data packets of a certain type or from a particular source, may be filtered from a traffic flow of data packets or may be prioritized such that they are transmitted from an input buffer, buffering system, and/or memory in a prioritized order. In some embodiments, data packets may be placed in a high priority buffer or allocation of memory based on one or more characteristics associated with the data packet.

When a characteristic determined in step 710 includes a duration of time that a data packet is stored in a memory or buffer, exemplary appropriate traffic flow control measures that may be applied to the data packet include discarding the data packet when the duration of time the data packet has been stored in the memory or buffer exceeds a threshold amount of time, prioritizing a order in which the data packets are transmitted from the memory and/or buffer, filtering the traffic flow of data packets based on the duration of time the data packets has been stored in the memory or buffer, and determining an egress port for the data packets by which the data packets may be transmitted from the switch to a communication device, like communication device 110 or an external device, like external device 150. Exemplary priority schemes include a first in, first out prioritization and a prioritization based on a final destination of data packets.

When a characteristic determined in step 710 includes an available capacity of an input buffer, exemplary appropriate traffic flow control measures that may be applied to a data packet or a traffic flow of data packets include various measures to, for example, increase the available input capacity of the input buffer such as truncating data packets, routing data packets to an alternate egress port, and discarding buffered data packets based on one or more criteria, determined in, for example, step 710. Such traffic control measures may be applied to a data packet and/or a traffic flow of data packets when, for example, a percentage, such as 80 or 90 percent, of input buffer capacity is used or otherwise unavailable.

When a characteristic determined in step 710 includes a data rate of a traffic flow of data packets, exemplary appropriate traffic flow control measures that may be applied to the traffic flow of data packets include a data limiting function which may serve to stop, pause, limit, decrease, and/or otherwise modify the flow rate of traffic incoming to the switch. The data limiting function may operate at, for example, a controller such as controller 145, at a data transmission entity, such as a processing device like processing device 240 and/or a communication device such as communication device 110. The switch, input buffer, controller, and/or data transmission entity may act to limit the data rate and/or types of data it transmits following receipt of a message or other indication that the switch has limited available input capacity.

Implementation of the data limitation function may act to, for example, decrease the transmission rate of the traffic, or may be the implementation of one or more filtration operations that serve to limit the flow of certain types of data packets while allowing other types of data packets to flow through to the switch without limitation. Thus, the filtration may be based on a set of priorities and/or criteria established and/or stored in, for example, the switch, the input buffer, the controller, the communication device, and/or at the data transmission entity.

In one embodiment, the ingress data rate may be analyzed in order to determine if it is too fast for the switch. In these instances, the traffic flow rate may be limited such that it may be compatible with the receiving switch. In some cases, the ingress data rate limit may be calculated based on the switch's available egress port bandwidth such that the switch is not overprescribed by accepting more data than it is capable of transmitting via its available egress port bandwidth.

Then, in step 720, the one or more appropriate traffic flow control measures, determined via step 715, may be applied to a data packet and/or traffic flow of data packets. Following step 720 process 700 may end.

Thus, systems, apparatus, and methods for managing an overflow of data packets received by a switch have been herein described.

What is claimed is:

1. A method comprising:

receiving a traffic flow of data packets by a processing device resident in an in-line network device via a bi-directional port resident in the in-line network device, wherein the in-line network device includes a plurality of bi-directional ports;

transmitting, by the processing device, the traffic flow of data packets to a switch resident in the in-line network device;

determining, by the switch, whether the switch has sufficient input capacity available to enable receipt of the transmitted data packets;

rejecting, by the switch, the transmitted data packets based on a determination that the input capacity at the switch is insufficient;

continuing to receive the traffic flow of data packets when the switch rejects the transmitted data packets by transmitting, via the processing device, the rejected data packets to a memory;

receiving and storing the rejected data packets by the memory;

determining, by the switch, after an interval of time whether the switch has sufficient input capacity available to enable receipt of the transmitted data packets;

transmitting, by the switch, a message to the processing device indicating that the switch has sufficient input capacity available to enable receipt of the transmitted data packets;

retrieving, by the processing device, the stored data packets from the memory responsively to the message;

transmitting, by the processing device, the retrieved data packets to the switch; and accepting, by the switch, the transmitted data packets.

2. The method of claim 1, wherein the switch includes an input buffer adapted to buffer incoming data packets, and the determination of whether input capacity is available at the switch includes: determining, by at least one of the switch and the input buffer, whether the number of data packets stored in the input buffer exceeds a threshold amount.

3. The method of claim 1, wherein the rejection of the transmitted data packets includes: transmitting, by the switch, a message to the processing device indicating that the switch has insufficient input capacity available to enable receipt of the transmitted data packets.

4. A method comprising:

receiving a traffic flow of data packets by an in-line network device via a bi-directional port, wherein the in-line network device includes a plurality of bi-directional ports;

transmitting the data packets to a switch by the in-line network device;

determining, by at least one of the switch and a controller, whether the switch has sufficient input capacity available to enable receipt of the transmitted data packets;

rejecting, by the switch, the transmitted data packets based on a determination that the input capacity at the switch is insufficient; and continuing to receive the traffic flow of data packets when the switch rejects the transmitted data packets by implementing via at least one of the switch and the controller, a traffic flow control measure based on a determination that input capacity available at the switch is insufficient, the traffic control measure comprising:

transmitting, by the in-line network device, the data packets rejected by the switch to a memory;

retrieving, by the in-line network device, the data packets from the memory responsively to a message indicating the switch has sufficient input capacity; and transmitting, by the in-line network device, the retrieved data packets to the switch.

5. The method of claim 4, wherein the switch includes an input buffer adapted to buffer incoming data packets and the determination of whether sufficient input capacity is available at the switch includes:

determining, by at least one of the switch, the controller, and the input buffer, at least one of whether the number of data packets stored in the input buffer exceeds a threshold number, whether a traffic flow rate of the traffic flow of data packets exceeds a threshold traffic flow rate, and whether the output capacity of the switch is sufficient to transmit the traffic flow of data packets to one or more external devices.

6. The method of claim 4, further comprising:

monitoring, by at least one of the switch and the controller, the incoming traffic flow rate of the one or more bi-directional ports; and implementing, by at least one of the switch and the controller, the flow control measure when the monitored traffic flow rate exceeds a threshold traffic flow rate.

7. The method of claim 6, wherein the implemented flow control measure comprises:

limiting, by at least one of the switch and the controller, the incoming traffic flow rate of at least one bi-directional port.

8. The method of claim 6, wherein determining the threshold ingress data packet flow rate comprises:

determining, by at least one of the switch and the controller, an amount of available output bandwidth for the switch; and determining, by at least one of the switch and the controller, the threshold incoming traffic flow rate based on the available output bandwidth.

9. The method of claim 4, further comprising:

determining, by at least one of the switch and the controller, a characteristic of a data packet included in the traffic flow of data packets; and implementing, by at least one of the switch and the controller, the flow control measure based on the determined characteristic.

10. The method of claim 9, wherein the implemented flow control measure is at least one of filtering the traffic flow of data packets based on the determined characteristic, sorting one or more data packets included in the traffic flow of data packets based on the determined characteristic, and discarding one or more data packets included in the traffic flow of data packets based on the determined characteristic.

11. The method of claim 4, further comprising:

buffering, by at least one of the switch and the controller, the traffic flow of data packets in a buffer;

determining, by at least one of the buffer and the controller, a characteristic of the buffered data packets; and performing an action, by at least one of the switch, the buffer, and the controller on the buffered data packets based on the determined characteristic.

12. The method of claim 11, wherein the action performed on the buffered data packets includes at least one of discarding a buffered data packet, prioritizing an order in which the buffered data packets are transmitted from the input buffer, filtering the traffic flow of data packets based on the determined characteristic, and discarding one or more data packets included in the traffic flow of data packets based on the determined.

13. The method of claim 11, wherein the determined characteristic is a duration of time that the buffered data packets are stored in the input buffer, the action performed on the data packet comprising at least one of:

prioritizing an order in which the buffered data packets are transmitted from the buffer;

determining a bi-directional port for a buffered data packet by which the data packet will be transmitted from the switch to an external device;

truncating a buffered data packet;

editing a buffered data packet; and discarding a buffered data packet.

14. The method of claim 4, wherein the flow control measure comprises:

transmitting, by at least one of the switch and the controller, a pause message to the in-line network device wherein the pause message instructs the in-line network device to pause its transmission of data packets to the switch.

15. The method of claim 14, wherein the pause message is compatible with the Institute of Electrical and Electronics Engineers (IEEE) 802.3 standard for Media Access Control (MAC) Ethernet Flow Control.

16. An in-line network device comprising:

at least one bi-directional port for receiving a traffic flow of data packets and transmitting at least a portion of the traffic flow of data packets;

a processing device for receiving the portion of the traffic flow of the data packets transmitted by the bi-directional port and for transmitting at least a portion of the traffic flow of data packets a switch for receiving the transmitted portion of the traffic flow of data packets from the processing device, and directing a received portion of the traffic flow of data packets to the bi-directional port;

a memory for receiving a portion of the traffic of data packets transmitted by the processing device due to implementation of a traffic control measure and storing the received portion of the traffic flow of data packets; and a controller for determining whether input capacity available at the switch is sufficient to enable receipt of a portion of the traffic flow of data packets transmitted by the processing device and for continuing to receive the portion of the traffic flow of the data packets when the input capacity available at the switch is insufficient by implementing a traffic flow control measure based on the determination, the traffic flow control measure, when implemented by the controller, causes the processing device to:

transmit the portion of the traffic flow of data packets to a memory when the input capacity available at the switch is insufficient;

retrieve the stored portion of the traffic flow of data packets from the memory responsively to a determination the input capacity available at the switch is sufficient; and transmit the retrieved data packets to the switch.

17. The in-line network device of claim 16, wherein the switch is at least one of an Ethernet switch, a packet switch, and a fabric switch.

18. The in-line network device of claim 16, further comprising: an input buffer for buffering at least a portion of the traffic flow of data packets.

19. A system comprising:

an in-line network device for receiving a traffic flow of data packets and transmitting data packets included in the traffic flow of data packets to a buffering system coupled to receive the traffic flow of data packets, wherein the buffering system comprises:

at least one bi-directional port for receiving the traffic flow of data packets from the in-line network device and transmitting the traffic flow of data packets to a switch;

a processing device for transmitting at least a portion of the traffic flow of data packets to at least one of a switch and a memory, the processing device configured to continue to receive the traffic flow of data packets when input capacity available at the switch is insufficient;

the switch for receiving a portion of the traffic flow of data packets transmitted by the processing device when input capacity available at the switch is sufficient to receive data packets transmitted by the processing device and directing a received portion of the traffic flow of data packets to an external device; and the memory, wherein the memory includes storage capacity for storing a portion of the traffic flow of data packets received from the processing device when the input capacity available at the switch is insufficient to receive the transmitted portion of the traffic flow of data packets 20. The system of claim 19, further comprising:

a controller for determining whether the input capacity available at the switch is sufficient to enable receipt of the transmitted portion of the traffic flow of data packets and implementing a traffic flow control measure based on a determination that input capacity available at the switch is insufficient to enable receipt of the transmitted portion of the traffic flow of data packets.

21. The system of claim 19, wherein the in-line network device is at least one of a network captured traffic distribution device, a network tap, a backplane device, a router, an aggregator, and a matrix switch.

22. The system of claim 19, wherein the storage capacity of the memory is capable of being dynamically allocated.

* * * * *